(12) United States Patent
Rhodes et al.

(10) Patent No.: US 12,184,939 B2
(45) Date of Patent: Dec. 31, 2024

(54) SYSTEMS AND METHODS FOR SEQUENCING ITEMS FOR SALE IN A LIVE VIDEO EVENT

(71) Applicant: WHATNOT INC., Marina Del Rey, CA (US)

(72) Inventors: Ryan Rhodes, Los Angeles, CA (US); Laura Rothman, Beverly Hills, CA (US); Benjamin Luce Brodie, Los Angeles, CA (US); Xiao Liu, Nepean (CA); Craig Jones, Dublin, CA (US)

(73) Assignee: WHATNOT INC., Marina Del Rey, CA (US)

( * ) Notice: Subject to any disclaimer, the term of this patent is extended or adjusted under 35 U.S.C. 154(b) by 0 days.

(21) Appl. No.: 17/958,305

(22) Filed: Sep. 30, 2022

(65) Prior Publication Data

US 2024/0114213 A1 Apr. 4, 2024

(51) Int. Cl.
*H04N 21/478* (2011.01)
*H04N 21/2187* (2011.01)

(52) U.S. Cl.
CPC ... *H04N 21/47815* (2013.01); *H04N 21/2187* (2013.01)

(58) Field of Classification Search
CPC .............. H04N 21/47815; H04N 21/2187
USPC .......................................................... 725/60
See application file for complete search history.

(56) References Cited

U.S. PATENT DOCUMENTS

| | | |
|---|---|---|
| 2006/0112003 A1 | 5/2006 | Levy et al. |
| 2009/0099939 A1 | 4/2009 | Thakur et al. |
| 2010/0325004 A1 | 12/2010 | Schoettle |
| 2012/0130843 A1 | 5/2012 | Himmerick et al. |
| 2014/0100991 A1* | 4/2014 | Lenahan ............ G06Q 30/0625 705/26.7 |
| 2015/0278209 A1* | 10/2015 | Lewis ................... G06F 16/639 707/722 |
| 2016/0381427 A1* | 12/2016 | Taylor ................. H04N 21/472 725/13 |
| 2018/0060945 A1 | 3/2018 | Hammond |
| 2020/0226676 A1 | 7/2020 | Hamor |
| 2021/0400142 A1* | 12/2021 | Jorasch ................ H04M 3/567 |

* cited by examiner

*Primary Examiner* — Nnenna N Ekpo
(74) *Attorney, Agent, or Firm* — MARSHALL, GERSTEIN & BORUN LLP

(57) ABSTRACT

A mobile software application implementing "live events," via which a host of the event may sequentially offer one, two, three, four or more items to a plurality of guests in the event (e.g., via auction, via direct purchase, or via a giveaway). The host's device may obtain and transmit a real-time video stream, which is in turn provided to each guest's device in conjunction with real-time information about the item(s) being offered. Particular techniques further assist the host in sequencing two or more items to be offered in the same live event, thereby avoiding delays and cumbersome user interface interactions that might otherwise be involved in initiating the offering of a next item upon concluding an offering of a previous item.

20 Claims, 24 Drawing Sheets

SYSTEMS AND METHODS FOR SEQUENCING ITEMS FOR SALE IN A LIVE VIDEO EVENT

TECHNICAL FIELD

The present disclosure generally relates to mobile computing device communications, and more specifically, to systems and methods for facilitating seamless transition between items being consecutively featured in a live, video-enabled event provided for sales of the respective items.

BACKGROUND OF THE DISCLOSURE

Technological improvements to mobile computing devices, such as smartphones, smart tablets, and the like, have offered opportunities to make various interactive electronic services available via mobile computing devices, where previously such services might have only been available at most via desktop and/or laptop computers. Such electronic services have included, for example, auctions of consumer goods, including collectible items such as trading cards, toys, figurines, comic books, video games etc.

In particular, an existing platform available on mobile computing devices enables a seller or "host" user to offer one, two, three or more items consecutively for sale (e.g., for auction or for direct purchase) via a live event. In the live event, the host's device records a real-time video/audio stream, which prospective bidders or "guests" view at their own devices in conjunction with a graphical user interface (GUI) that enables the guests to send and receive communications regarding the auction(s) (e.g., bids, comments, updates to items, etc.) substantially in real-time. The host can use their transmitted video stream to, for example, visually feature a currently offered item and/or other items in the host's collection. At least these aspects of live events provide substantial benefits over conventional systems for online auctions, for example by enabling hosts and guests to send and receive updated information substantially in real-time without the devices having to reload or refresh the GUI by which the devices participate in the event, thus providing uninterrupted, social access to the live event. Further description, including system implementation details for live events, is provided in U.S. Pat. No. 11,196,577, filed Apr. 22, 2021, which is hereby incorporated by reference herein in its entirety.

SUMMARY

Although the live events described in the foregoing background provide technical and practical advantages, the present description identifies still further improvements that may be made, particularly in providing a more seamless transition between the respective offerings of two or more items (e.g., for auction, for direct purchase, or for specially-featured "giveaways") in the live event.

Previous implementations of live event systems enabled an event host to sequentially offer two or more items for sale (e.g., auction or direct "buy it now" purchase), thus allowing the two or more items to be featured to the same group of guests without the guests needing to navigate to a different page or manually reload content. Although these existing capabilities have recognizable value for both the event host and the guests, the act of sequencing the two or more items incurred some difficulties for the host. Specifically, upon conclusion of a sale of a first item (e.g., the timer running out on an auction), initiating the sale of a second item would usually involve the host navigating their device to the host's personal item inventory (e.g., a list), selecting an item from the list, and confirming the selected item as being the second item for which the sale is to begin. For hosts whose inventories total a large number of items, this operation could prove cumbersome, resulting in delays experienced by both the host and the guests.

In view of these challenges, the present disclosure at a high level provides systems and methods that assist the host in more sequencing the offerings of two or more items by providing a simple control in a host interface that enables automated transition to an offering of a second item in the live event upon conclusion of an offering of a first item. These capabilities are integrated into existing modes of offering items in the live event (namely, auction sales and direct purchase sales), but also into a third "giveaway" mode of offering an item, which will be described in further detail in the present disclosure.

In embodiments, a computer-implemented method for sequencing respective offerings of a plurality of items to be offered in a live event is provided, the method being performed via one or more processors of a client computing device of a host user of the live event. The computer-implemented method may include (1) receiving selections of the plurality of items to be offered to a plurality of guest users at respective guest devices in the live event, (2) transmitting, to one or more servers, first communications indicative of the selections of the plurality of items, (3) determining that a first offering of a first item of the plurality of items in the live event has concluded, (4) responsive to determining that the first offering of the first item has concluded, automatically displaying, via a first graphical user interface of the client computing device of the host user, a control selectable to automatically initiate a second offering of a second item of the plurality of items, and/or (5) responsive to receiving a selection of the control, automatically transmitting, to the one or more servers, second communications to cause the one or more servers to initiate the offering of the second item via the live event by distributing information associated with the second offering of the second item to each of the plurality of guest devices. The computer-implemented method may include additional, fewer, and/or alternate actions, in various embodiments.

In embodiments, one or more non-transitory computer readable media are provided. The one or more non-transitory computer readable media may store non-transitory computer executable instructions that, when executed via one or more processors of a client computing device of a host user of a live event, cause the client computing device to (1) receive selections of a plurality of items to be offered to a plurality of guest users at respective guest devices in the live event, (2) transmit, to one or more servers, first communications indicative of the selections of the plurality of items, (3) determine that a first offering of a first item of the plurality of items in the live event has concluded, (4) responsive to determining that the first offering of the first item has concluded, automatically display, via a first graphical user interface, a control selectable to automatically initiate a second offering of a second item of the plurality of items, and/or (5) responsive to receiving a selection of the control, automatically transmit, to the one or more servers, second communications to cause the one or more servers to initiate the offering of the second item via the live event by distributing information associated with the second offering of the second item to each of the plurality of guest devices.

The one or more non-transitory computer readable media may include additional, fewer, and/or alternate instructions, in various embodiments.

In still other embodiments, a client computing device is provided, the client computing device being associated with a host user in a live event. The client computing device may include one or more processors, and one or more memories storing non-transitory computer executable instructions. The instructions, when executed via the one or more processors, may cause the client computing device to (1) receive selections of a plurality of items to be offered to a plurality of guest users at respective guest devices in the live event, (2) transmit, to one or more servers, first communications indicative of the selections of the plurality of items, (3) determine that a first offering of a first item of the plurality of items in the live event has concluded, (4) responsive to determining that the first offering of the first item has concluded, automatically display, via a first graphical user interface, a control selectable to automatically initiate a second offering of a second item of the plurality of items, and/or (5) responsive to receiving a selection of the control, automatically transmit, to the one or more servers, second communications to cause the one or more servers to initiate the offering of the second item via the live event by distributing information associated with the second offering of the second item to each of the plurality of guest devices. The client computing device may be configured to perform additional, fewer, and/or alternate actions, in various embodiments.

DETAILED DESCRIPTION

Figure 1:
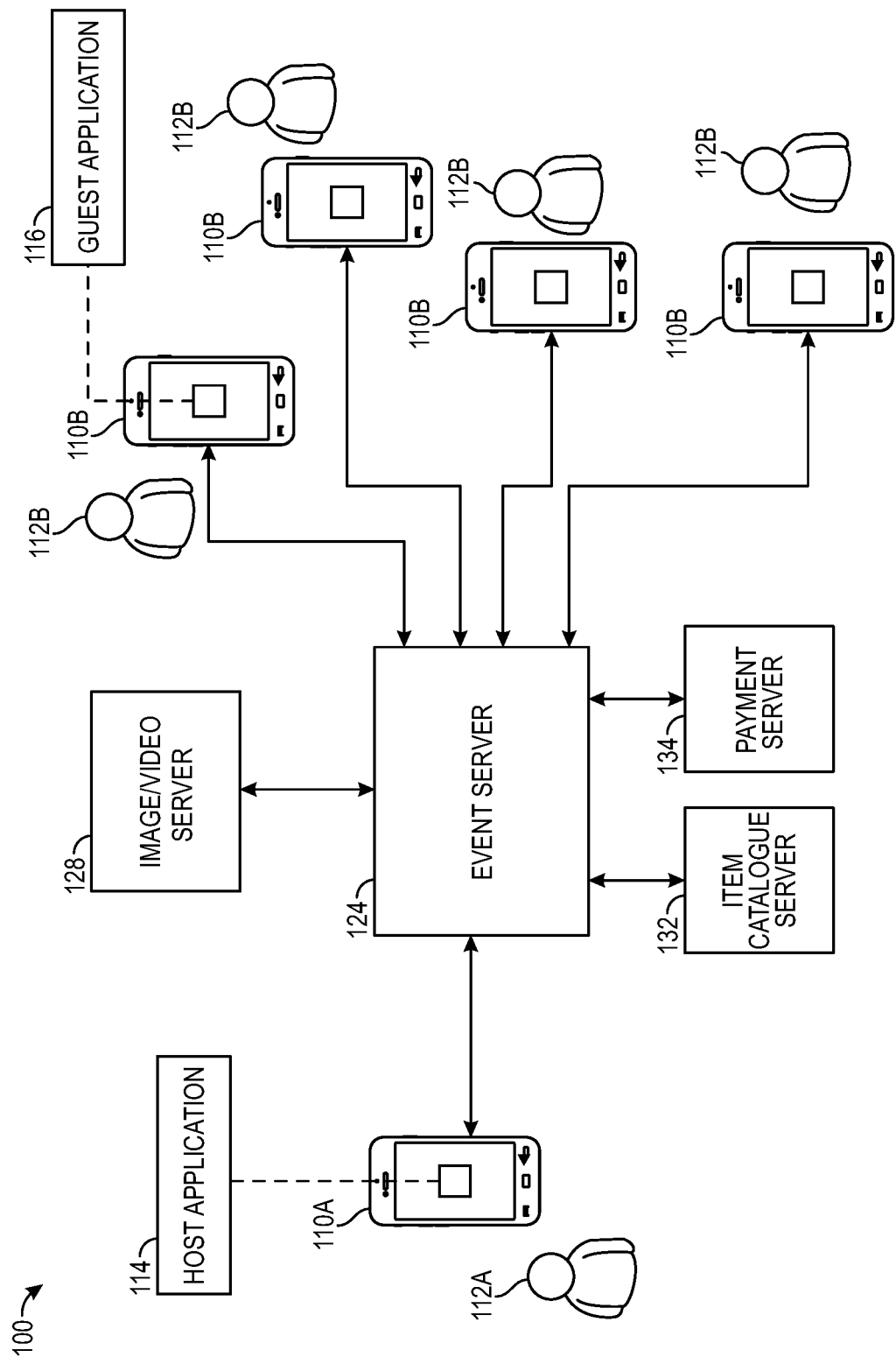
FIG. 1 is a block diagram of an example computing environment, in accordance with some embodiments of the present description.

Embodiments of the present description relate to computing systems and methods that, broadly speaking, utilize a software application implemented at mobile electronic computing devices and/or other electronic computing devices, the application allowing "host" users to host a live event to offer (e.g., for auction, for direct purchase, or as a giveaway) various collectible items such as trading cards, card packs, toys, figurines, comic books, manga, vintage video games, clothing, etc. Embodiments of the present description further relate to particular techniques for assisting the host in sequencing two or more items to be offered in the same live event, which offer improvements over previous implementations of the live event.

A live event, as described in the foregoing background section of the present disclosure enables a host (sometimes referred to herein as aa "seller") to offer one, two, three, four or more items to prospective buyers ("guests" in the event) in conjunction with transmitting a real-time video stream from the host's computing device (e.g., a smartphone). The real-time video stream is ultimately displayed at each of the guests' devices (e.g., smartphones of each guest) in conjunction with real-time information associated with the one, two, three, four or more items (and more particularly, the item currently being offered for auction, direct purchase, etc.).

An extensive description of the implementation of live events, with respect to various example graphical user interfaces (GUIs) for host and guest devices, is provided in U.S. Pat. No. 11,196,577, filed Apr. 22, 2021. Generally speaking, though, a live event may make various interactive graphical user interfaces (GUIs) available to guest devices, via which any guest may, for example, competitively bid on or directly purchase a currently offered item, post comments for viewing by other guests and/or the host in the event, explore other items available from the host, and/or access various other social features all still in conjunction while viewing the real-time video stream at the guest's device. The implementation of any live event may, more particularly, utilize a "publish/subscribe" messaging architecture, in which one or more servers act as a message broker to distribute messages to hosts and to guests based upon stored registry information and publish/subscribe logic that defines which devices (i.e., which hosts and/or which guests) are to receive particular classes of messages published or generated at the server(s) during progression of the live event. To participate in the live event, each host and each guest device forms a persistent connection to the server(s) (e.g., via a WebSocket), the respective connections thereby enabling each host and each guest to exchange substantially real-time information regarding the live event via the server(s) without interrupting the transmitting/displaying of the real-time video stream (e.g., without needing to refresh or reload pages). Thus, the live event provides a robust and stable social environment via which users may view and engage in offerings of one, two, three, four, ten, twenty, fifty, one hundred or more items. A live event application as described in the present disclosure can provide various GUIs and/or other functionalities that enable a guest to navigate, find, and join live events (or "live event channels") of a particular host or relating to a particular item or item category that interests the guest (examples of such GUIs are found in U.S. Pat. No. 11,196,577).

Previous implementations of live event systems enabled an event host to sequentially make two or more items offered through the live event. However, the act of sequencing the items could prove cumbersome for the host, and introduce delays from the perspective of the guests. Upon conclusion of a sale of a first item (e.g., the timer running out on an auction), initiating the sale of a second item would usually first involve the host navigating their device from a main host interface to the host's personal item inventory (listing items available to be offered by the seller, including items personally possessed by the seller and/or items held by an intermediary or broker with authorization of the host to offer). From the host's inventory, the host would select a particular item to be the second (i.e., next) item to be offered e.g. for auction or direct sale. Finally, the host would confirm the selection of the item and/or any additional parameters associated with the offering of the selected item (e.g., auction duration, auction starting price or increment, direct purchase price, etc.).

Although the above-described process ostensibly involves just a few user interface interactions by the host, the process in practice can significantly delay the start of the offering of the second item. Users who most frequently host live events often are those with the largest inventories, and navigating an inventory of tens, hundreds, or even over a thousand items may prove cumbersome. Delays in selection of the next offered item are passed on to guests, who experience the event as temporarily lacking a current offered item.

Systems and methods of the present disclosure improve the sequencing of two or more items in a live event in a manner that may reduce delays experienced by both host and guests. At a high level, an item queue for the live event is established, which may initially be based upon an order in which the host added the items to the live event (e.g., before starting of the live event, as detailed in U.S. Pat. No. 11,196,577). At any time during the live event, the host may "pin" any selected item among the host's inventory to the top (i.e., front) of the queue to indicate that the pinned item is to be the next item offered (e.g., as an auction, or as a direct purchase, or another form of offering which the host can choose for the item any time before the offering of the item begins). In any case, upon conclusion of the offering of an item (a "first item"), a "Run Next" control is provided via the host GUI to enable the host to automatically start the offering of the next (e.g., second) item in the item queue. Upon starting the offering of the second item, the second item is removed from the queue, and thus the "Run Next" feature can be reused to successively move between offerings of first, second, third, fourth, etc. items. Thus, the Run Next feature reduces the complexity of navigating user interfaces for the host selecting a next item, and significantly reduces delays in sequencing two or more items in the live event. These two or more items may include two or more unique instances of similar or same items (e.g., two of an identical figurine, trading card, etc.), and/or two or more different types/categories of items altogether.

The present description will first provide an example computing environment in which techniques of the present description can be implemented. Subsequently, the present disclosure will describe a "giveaway" mode of offering an item for any guest currently participating in the live event. Following the description of giveaways, additional sections of the present disclosure will describe in further detail the systems and methods for sequencing the offerings of two or more items in the live event, which systems/methods may be applied to auction offerings, direct purchase offerings, and/or giveaway offerings. Finally, the present disclosure will describe further examples of systems and methods in view of the other portions of this disclosure.

Example Computing Environment

FIG. 1 depicts a block diagram of an example computing environment 100 via which techniques of the present description may be implemented. In particular, elements of the computing environment 100 may implement live events (e.g., including one or more live auctions, offers for direct purchase, and/or giveaways) and integrate the Run Next feature of the present disclosure into the live events to improve the sequencing of any two or more items in a live event. Although various components of the example computing environment 100 will be described below, it should be understood that additional, fewer, and/or alternate components may be envisioned in various embodiments, without necessarily deviating from the techniques described herein.

The computing environment includes a first mobile computing device 110a associated with a first user 112a, and a plurality of second mobile computing devices 110b associated with respective ones of a plurality of second users 112b. Mobile computing devices 110a and 110b may include, for example, smartphones, smart tablets, smart wearable devices, other suitable mobile devices, or some combination thereof. Although mobile computing devices 110a and 110b are discussed herein, it should be understood that the mobile computing devices 110a and 110b may, in some embodiments, be substituted for desktop computers and/or other non-mobile devices.

In the example environment 100, the first user 112a represents a "host" of a live event described herein, e.g., a person or entity making one or more items available for auction, direct purchase, and/or giveaway. Accordingly, the first mobile computing device 110a is generally referred to herein as a host device 110a. The second users 112b in this example represent prospective buyers/recipients (or simply "guests") who access the live event via the systems/methods described herein to view items, bid upon or purchase items, and/or perform various other actions described herein. Accordingly, the mobile computing devices 110b are referred to herein as guest devices 110b.

Each of the mobile computing devices 110a and 110b may respectively comprise one or more computer processors and one or more non-transitory computer memories storing instructions that, when executed via the one or more processors, cause the device 110a or 110b to perform the actions attributed to the device 110a or 110b in the present description. In the case of the host device 110a, the one or more non-transitory memories may store one or more software applications 114 ("host application") including one or more sets of non-transitory computer executable instructions that, when executed via the one or more processors, cause the host device 110a to perform actions described herein. Similarly, the one or more memories of each guest device 110b may store one or more software applications 116 ("guest application") including one or more sets of non-transitory computer executable instructions that, when executed via the one or more processors of the guest device 110b, cause the guest device 110b to perform actions described herein. Although host application 114 and guest application 116 are depicted as separate blocks in FIG. 1, it should be understood that applications 114 and 116 may represent separate aspects of the same one or more applications (e.g., a single application stored and executed both at devices 110a and 110b, in which each user 112a or 112b may alternatively operate as a host or guest using the single application). Each of the host device 110a and guest devices 110b may comprise one or more application programming interfaces (APIs) operable for example to (1) generate and display GUIs, (2) capture or otherwise obtain still images and/or videos, (3) display images, videos, item information, and/or other information described herein, (4) communicate with one or more servers (e.g., to receive real-time item information and/or communicate bids/purchases placed via the each device), and/or perform other actions described herein.

The host device 110a (and, in some instances, the guest devices 110b) may comprise one or more camera devices, which may for example capture a real-time video stream for a live event. Additionally, in some embodiments, the host device 110a (and in some instances, the guest devices 110b) includes one or more microphones and/or speaker, which may capture, transmit, and/or play audio (e.g., accompanying audio in a video stream). The one or more camera devices, microphones, and/or speakers may include integrated devices (e.g., a camera, microphone, or speaker natively included in a mobile computing device) and/or devices otherwise communicatively tethered to the host device 110a or guest device 110b (e.g., a peripheral webcam, speaker, or microphone connected wiredly or wirelessly to the mobile computing device). Additionally, each of the host device 110a and guest devices 110b may include one or more interactive I/O units (e.g., touchscreens, touchpads, keyboard, etc.) enabling navigation of graphical user interfaces, viewing of images and/or videos in the context of a real-time video stream, and/or interactive functionalities described herein.

An event server 124 (i.e., one or more servers) may facilitate communications among devices 110a and 110b, and may store various information associated with implementation of the live events as described herein. For example, the event server 124 may store and distribute information relating to items and/or item queues, and/or implement logic relating to offerings of items via auction, direct purchase, and/or giveaway. Additionally or alternatively, the event server 124 may store and/or distribute still other information such as user profile information, user device configuration information, live event metrics and analytics, etc. The event server 124 may include one or more processors and one or more non-transitory computer readable memories storing instructions that, when executed via the one or more processors, cause the event server 124 to perform the actions described herein.

The event server 124 may communicate with still additional servers to facilitate other functions described herein. For example, an image/video server 128 may facilitate operations of the event server 124 by facilitating provision of the real-time video stream from the host device 110a to the guest devices 110b (e.g., the host device 110a may provide the real-time video to the image/video server 128, which in turn may stream the image/video to the guest devices 110b without the host device 110a needing to be explicitly aware of each of the guest devices 110b). Additionally or alternatively, an item catalogue server 132 may store a listing of known items, from among which hosts 112a may explore and select one or more items to be included for auction in live events. Still additionally or alternatively, a payment server 134 may store and process payment information relating to hosts 112a and/or guests 112b who are to acquire items via the live events described herein. Although each of the event server 124, image/video server 128, item catalogue server 132, and payment server 134 are described in singular herein, it should be understood that each of the servers 124, 128, 132, and 134 may respectively comprise one or more server devices, with functions thereof being distributed among the one or more servers.

Arrows in FIG. 1 represent signal communications exchanged among the elements of the computing environment 100. Elements of the computing environment 100 may communicate via any suitable one or more communications networks (e.g., the Internet, a wired or wireless local area network (LAN), etc.). Elements of the computing environment 100 may communicate of via any suitable one or more communication protocols, including for example a mobile cellular communications protocol (e.g., CDMA, GSM, EV-DO, LTE, IP, etc.), one or more IEEE 802.11 protocols (e.g., Wi-Fi), Bluetooth, and/or other suitable protocols in accordance with the computing capabilities of respective elements of the computing environment 100.

Generally, each of the image/video server 128, the item catalogue server 132, and the payment servers 134 may respectively comprise one or more processors and one or more non-transitory memories storing computer executable instructions that, when executed by the one or more processors, cause the server(s) to perform actions described herein. Although arrows in FIG. 1 connect the mobile computing devices 110a and 110b to the servers 128, 132, and 134 by way of the one or more event servers 124, it should be noted that in some embodiments, the server(s) 128, 132, and/or 134 may exchange communications directly with the mobile computing devices 110a and 110b. Furthermore, although the servers 124, 128, 132, and 134 are depicted in FIG. 1 as separate elements, it should be understood that functions of the servers 124, 128, 132 and 134 may be combined in various manners, in some embodiments. For example, in some embodiments, the event server 124 is configured to also perform at least some of the functions of the image/video server 128, the item catalogue server 132, and/or the payment server 134.

Subsequent portions of the present description, with reference to FIGS. 2A-2F, 3A-3F, 4A-4F, 5A-5C, 6, and 7 provide examples of communications, GUIs, devices and computer-implemented methods associated with implementation of the functionalities described herein. In various embodiments, described communications, GUIs, actions, etc. may be implemented by suitable components of the computing environment 100 described above. Where interactive GUIs at a mobile computing device are described, interactions with the interactive GUIs may occur, for example, via touchscreen interactions, voice commands, and/or other suitable forms of user input at devices 110*a* and/or 110*b*. Described logic, communications, and functionalities may be implemented by way of the event server 124 and/or other servers of FIG. 1 which are in communication with the devices 110*a* and 110*b*.

Giveaway Offerings in Live Video Events

Previous implementations of a live event application generally enabled two modes of offering an item by a host to a number of guests in a live event. A first "auction" offering mode features a chosen item in the live event for a particular duration of time, during which any registered guests currently enrolled in the live event channel (e.g., currently viewing the real-time video at their guest device) can competitively bid on the item at progressively increasing amounts. The auction offering ends at the end of the particular duration of time, and the highest bid at the end of the duration of time is awarded the item. A second "direct purchase" (or "buy it now") offering mode features a chosen item in the live event for up to a maximum duration of time at a set price. The direct purchase offering ends when any guest has purchased the item at the set price or, if no guest has purchased the item, at the end of the maximum duration of time. In either offering mode, the live event features the item by providing each guest device with real-time information associated with the offered item and the offering (e.g., item details, progress of the auction or direct purchase offering, etc.) in conjunction with the real-time video stream. Moreover, upon conclusion of the offering of an item in either mode, the host can select a next item to be offered in the same live event without interruption of the host's real-time video stream. Further implementation details for auction and direct purchase offerings are provided in U.S. Pat. No. 11,196,577, filed Apr. 22, 2021.

Proposed herein is a third offering mode distinct from auctions and direct purchase offerings. This third mode is referred to herein as a "giveaway," in which the offered item is to be awarded to a randomly selected guest in the live event at a time chosen by the host. Guests register for inclusion in the random selection by selecting a particular option displayed at their respective devices in the live event while the giveaway is active. The selected guest receives the awarded item at no cost, including no cost for shipping of the item to the guest (the shipping cost may be covered by the host and/or by an intermediary). Otherwise, as will be described with respect to figures, the giveaway offering mode supports numerous capabilities similar to those in auction and direct purchase modes, e.g., capabilities for selecting items by the host, viewing the item via the real-time video stream, commenting within the live event, etc.

Details of operation of the giveaway offering mode will be provided with respect to FIGS. 2A-2F and 3A-3F, which depict example graphical user interfaces (GUIs) that may be displayed at host and/or guest devices in accordance with giveaways. Particularly, FIGS. 2A-2F depict GUIs displayed at a host device 202, and more particularly at a display 204 thereof (e.g., a touchscreen). FIGS. 3A-3F depict example GUIs displayed at a guest device 302, and more particularly at a display 304 thereof (e.g., a touchscreen). The GUIs of FIGS. 2A-2F and 3A-3F may be displayed at the respective devices 202/302 based upon execution of non-transitory computer-executable instructions included in a live event application (as described herein) stored at the devices 202 and/or 302.

Figure 2A:
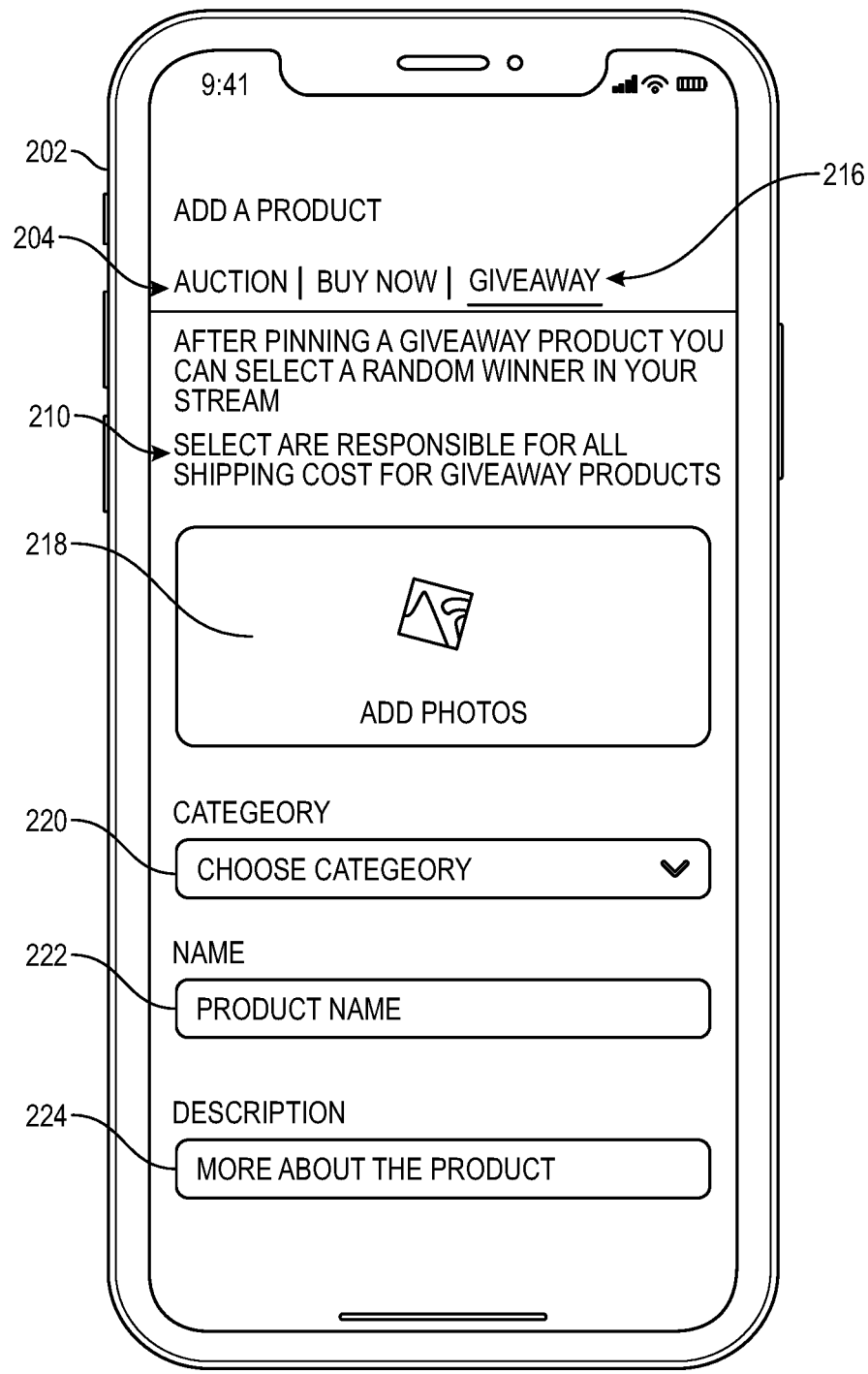
FIG. 2A is an example representation of an add product graphical user interface (GUI) executing on a mobile computing device, in accordance with some embodiments.
Figure 2B:
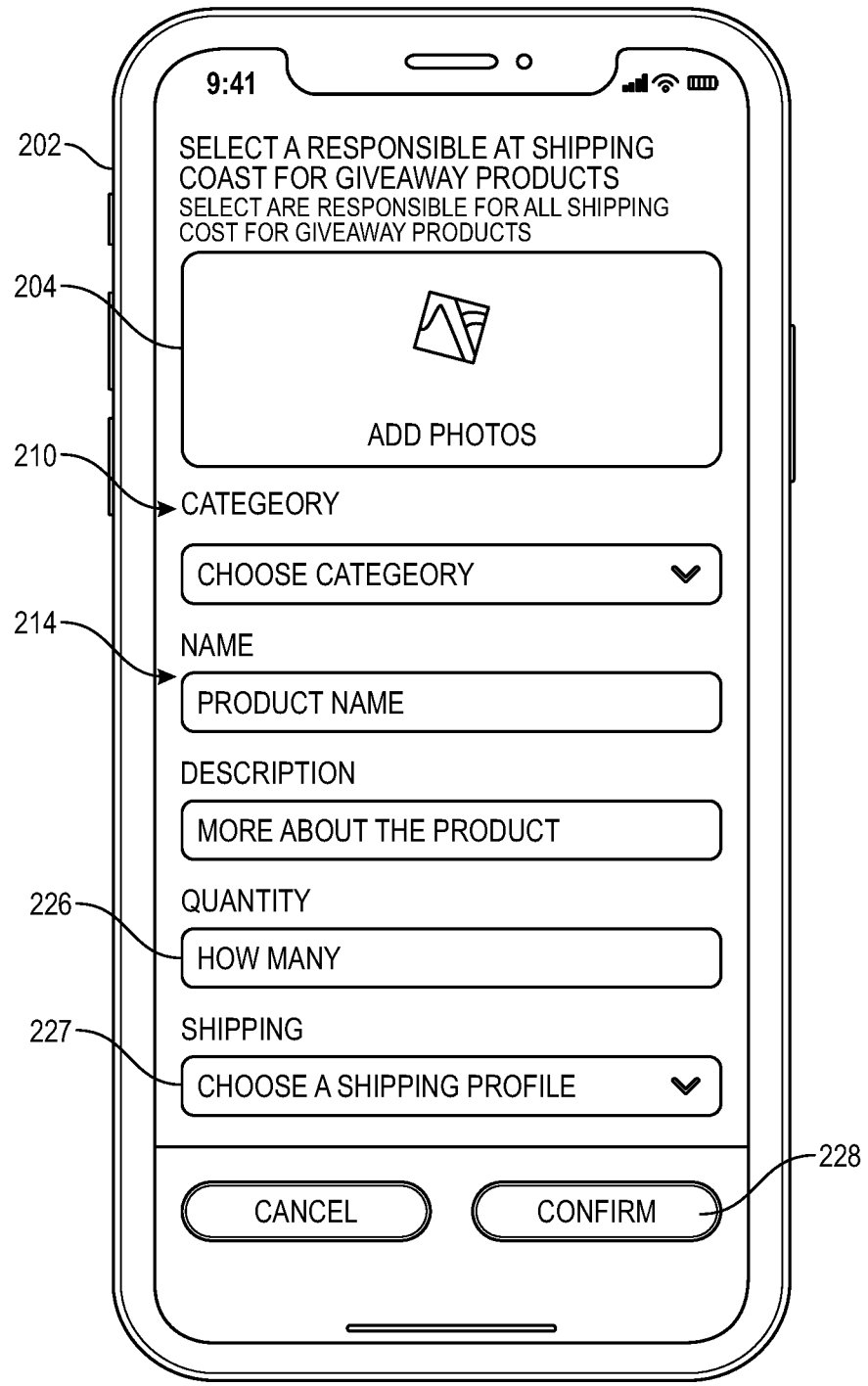
FIG. 2B is an example representation of a continuation of the add product GUI of FIG. 2A, in accordance with some embodiments.

FIGS. 2A and 2B depict an example of an add product GUI 210 via which the live event host may add an item to the host's live event to be featured in the form of a giveaway. Particularly, FIG. 2A depicts a first portion 212 of the GUI 210, and FIG. 2B depicts a second portion 214 of the GUI 210. The host can navigate between the portions 212 and 214, for example, by scrolling within the GUI 210 (e.g., touchscreen scrolling downward from the portion 212 to the portion 214). The host may access the GUI 210, for example, as part of a process of pre-configuring items to be included in a live event scheduled for a future time. Additionally or alternatively, in some embodiments, the host may access the GUI 210 during the live event itself to thereby add another item to be featured in the live event.

In any case, the GUI 210 includes a navigation ribbon 216 that enables the host to choose whether the added item is to be featured in the auction mode, in the direct purchase ("Buy Now") mode, or in the giveaway mode. Selecting the offering mode may cause the GUI 210 to automatically update with new fields to enable the host to define appropriate parameters for the offering (e.g., a timer duration and initial auction price for the auction mode, a timer and direct purchase price for the direct purchase mode, and/or other suitable parameters such as those described herein). In the case of the chosen giveaway mode, the GUI 210 includes an add photo option 218, via which the host may add an image of the item (e.g., from the host's local image gallery or from an image library of the live event application) to be provided alongside the item in host/guest item histories, within a shipping label or receipt, etc. A category field 220, name field 222, and description 224 enable the host to add further information regarding the item, the information to be displayed in the live event channel. Moving to FIG. 2B, a quantity field 226 enables the host to define that one, two, three or more of the item is to be offered in the giveaway (e.g., one guest may be randomly selected to receive all quantity of the item, or different guests can be randomly selected to each receive one (or more) of the item). A shipping field 227 enables the host to define shipping information to be used to ship the offered item to the randomly-selected guest(s). Finally, a confirm option 228 can be selected to finalize addition of the defined item(s) to the host's live event.

Figure 2C:
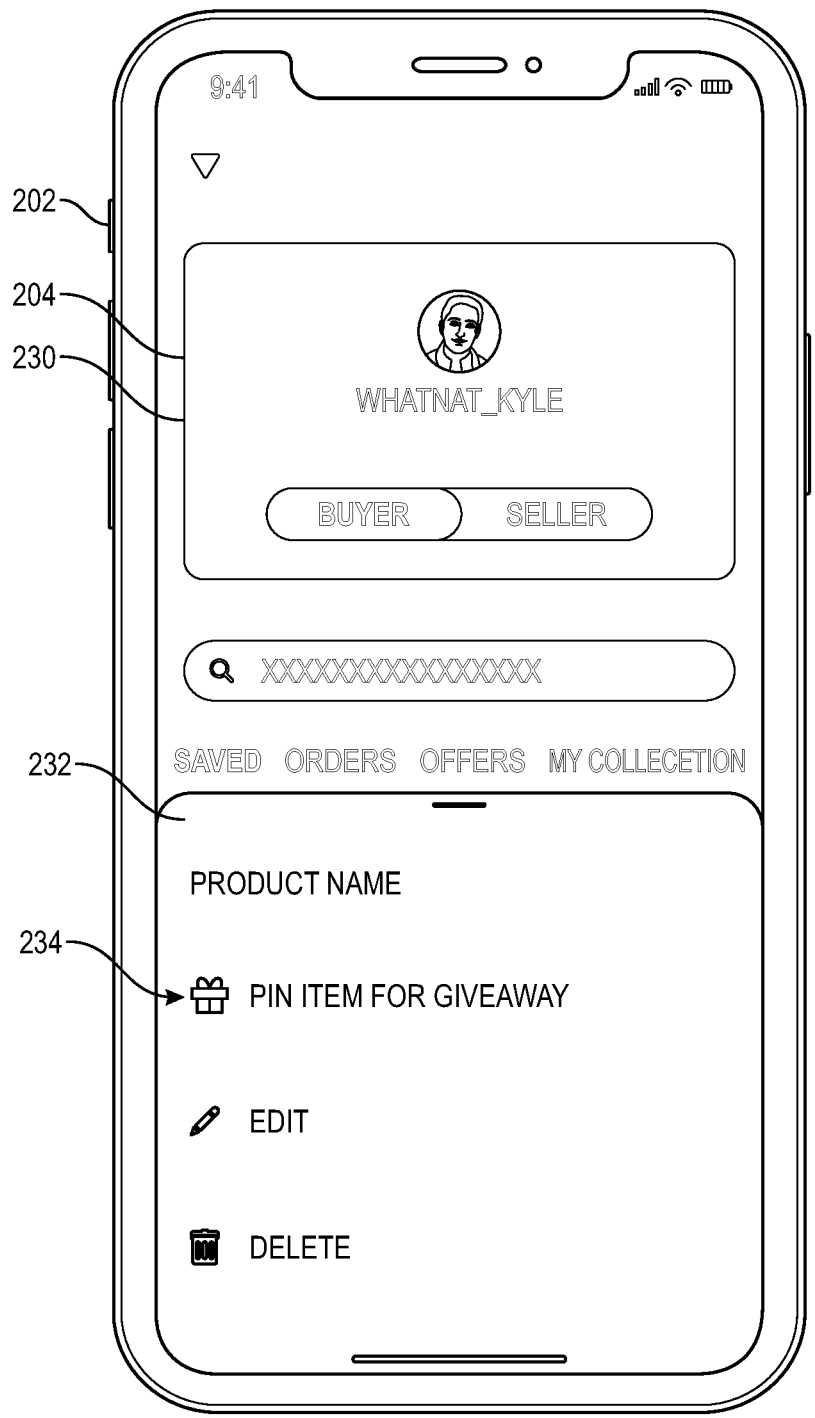
FIG. 2C is an example representation of an item details GUI executing on a mobile computing device, in accordance with some embodiments.

FIG. 2C depicts an example item details GUI 230 associated with the item inventory of the host, the inventory being accessible from the host's user profile and/or from within the host's live event channel. Upon selecting an item from the host's item inventory, an overlay 232 provides options to manage, edit and/or delete the item from the inventory. Particularly, a "pin" option 234 enables the host to set a pinned item as the next item to be featured (i.e., offered) in the host's live event, as will be described further with respect to the "Run Next" feature in subsequent portions of this disclosure.

Figure 2D:
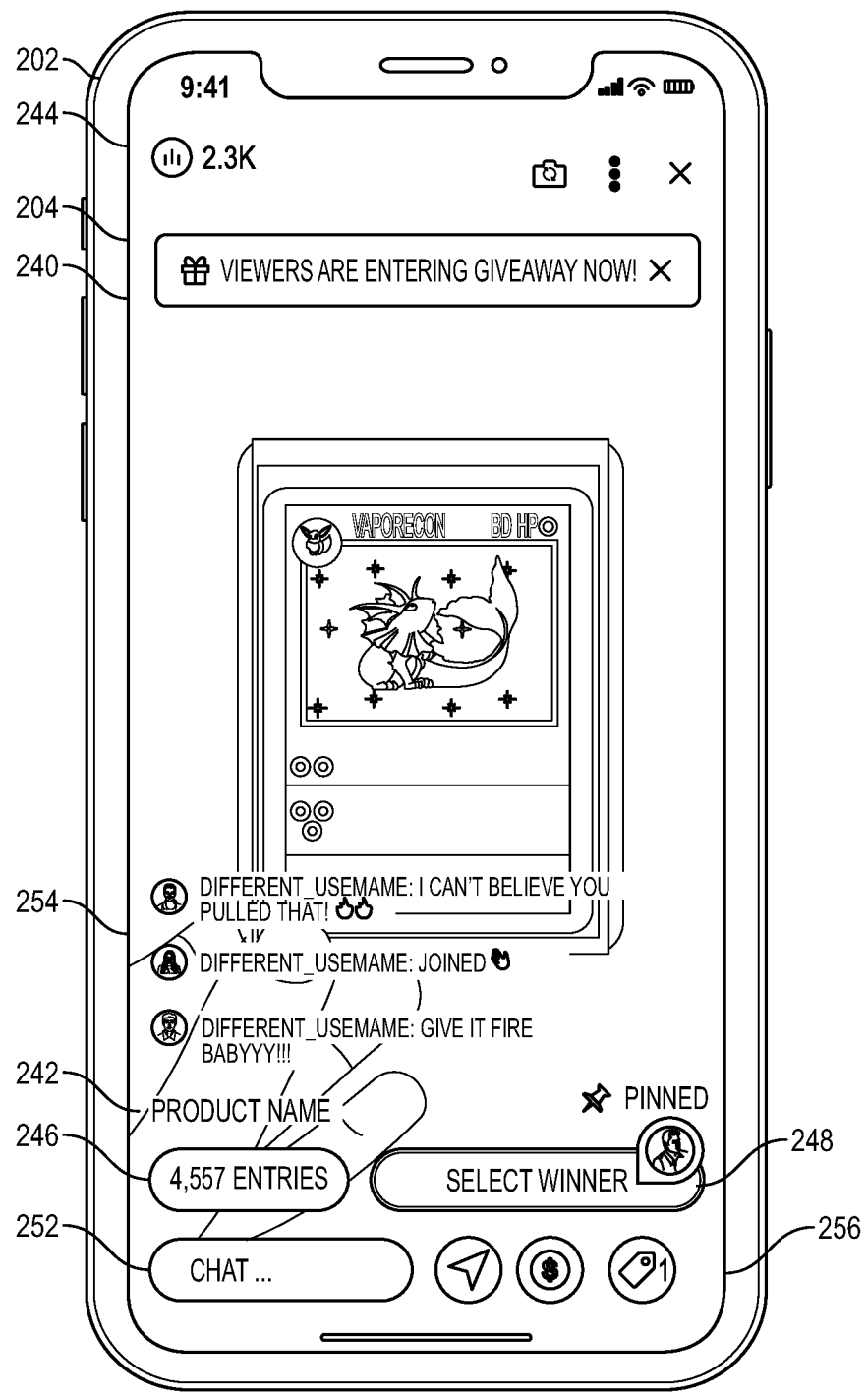
FIG. 2D is an example representation of a host live event channel GUI executing on a mobile computing device, in accordance with some embodiments.

FIG. 2D depicts an example live event channel GUI 240 representing the host's view of the host's live event channel. The GUI 240 displays the real-time video stream of the host (e.g., the contents of the host's rear-facing device camera), with various information and/or controls overlaying the real-time video stream. Item information 242 may display the item name, description, quantity, and/or other relevant information associated with the item(s) for giveaway. A viewer count 244 indicates the current (real-time) number of guests in the live event channel, and an entries count 246 indicates the current number of guests entered into the particular giveaway. At any time, the host may select a select winner option 248 to cause the random selection of a guest (or, in some cases, more than one guest) to receive the item offered for giveaway. Still other features of the live event channel GUI 240 include a chat field 252 (with entered chats being shown in a chat field 254 above the item information 242) and an item inventory option 254 that enables the host to summon their item inventory (e.g., to select future items to be offered and/or to modify information associated with the host's items).

Figure 2E:
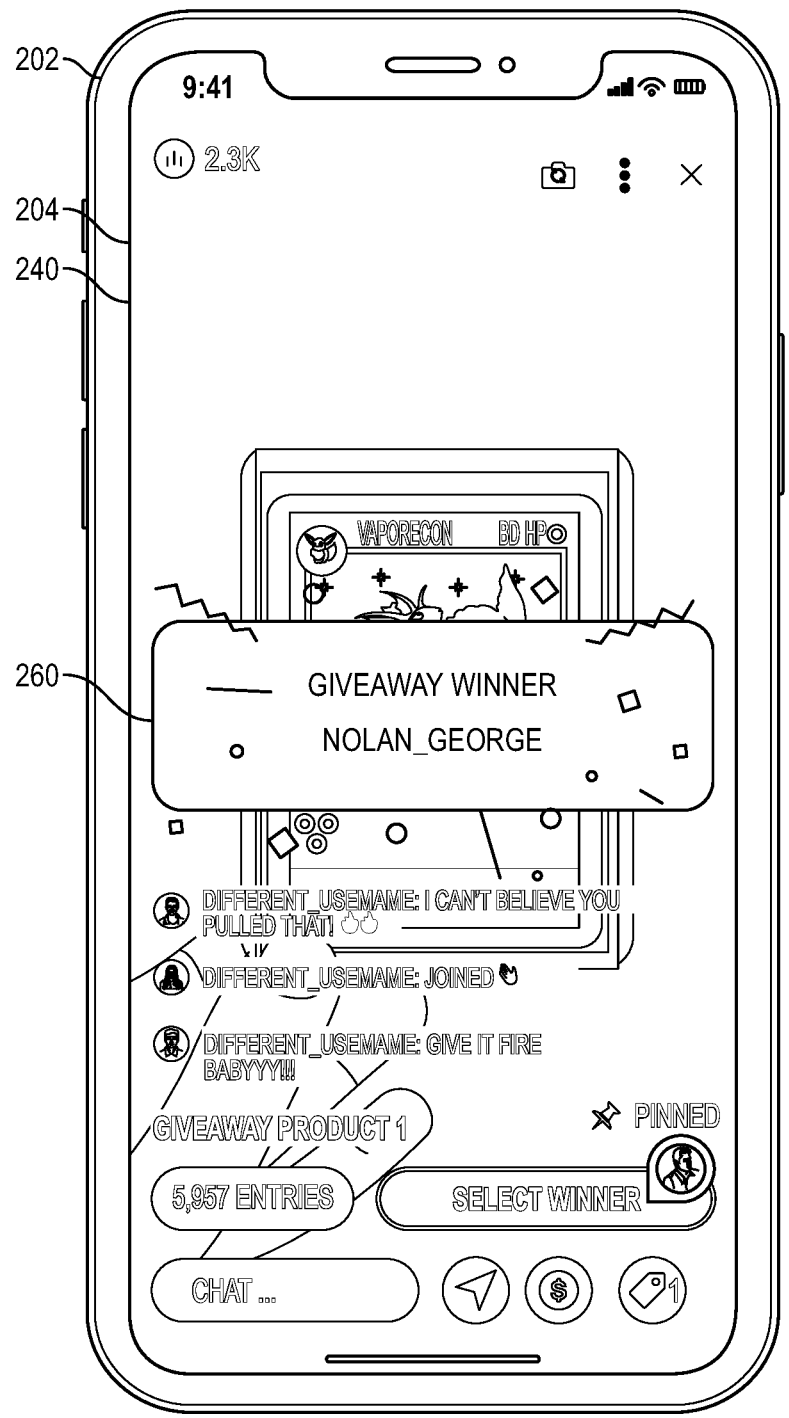
FIG. 2E is an example representation of a giveaway winner GUI executing on a mobile computing device, in accordance with some embodiments.
Figure 2F:
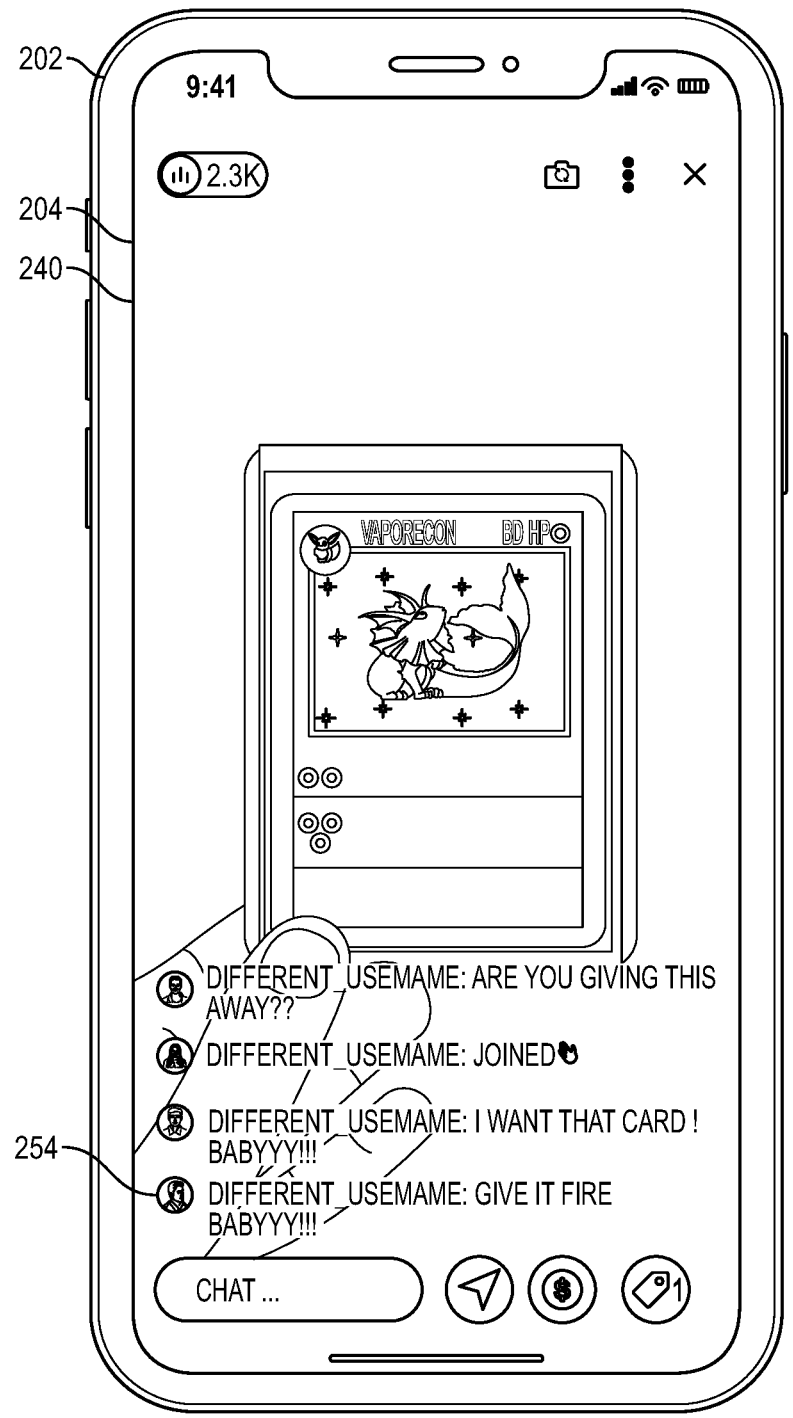
FIG. 2F is another example representation of a host live event channel GUI executing on a mobile computing device, in accordance with some embodiments.

FIG. 2E depicts a giveaway winner GUI 260 displayed over the GUI 240 of FIG. 2D in response to the host selecting the select winner option 248 from the GUI 240. The giveaway winner GUI 260 indicates a username of a guest (or, in some cases, more than one guest), randomly selected by the live event application from among the guests entered in the giveaway at the time of selection of the option 248. Various animations can be included in the GUI 260, e.g., a "slot machine" GUI to scroll through possible usernames of the guests entered in the giveaway before settling on the selected user. FIG. 2F depicts another example view of the live event channel GUI 240 after selection of the option 248, with the chat log 254 displaying a message indicating the winner of the giveaway while maintaining the view of the real-time video stream in the GUI 240.

In some embodiments, still other options are available to the host to further define who is eligible for the giveaway and/or other behaviors of the giveaway. For example, in some implementations, the host can limit the giveaway to guests registered in a same country as the host, for ease of shipping. The country of the guest is based upon user profile information associated with the user profile of the guest. In some embodiments, the giveaway may be configured such that guests entering the giveaway automatically "follow" the host upon entering the giveaway (e.g., causing the followed host's live events to be featured more prominently in navigation GUIs of the live event application from the perspective of the guest). Moreover, in some embodiments, a maximum time limit is imposed for giveaways, e.g., the selection of the winner(s) may be automatically performed after a predetermined duration of time has elapsed since the start of the giveaway offering.

Moving to FIGS. 3A-3F, GUIs presented at the guest device 302 enable the guest to enter the giveaway, and to identify the winner of the giveaway once selected. First referring to FIG. 3A, another live event channel GUI 310 from the guest perspective includes the real-time video stream of the host overlaid with similar item information to that described with respect to FIG. 2D (e.g., item information, chats, viewer count, host name, item inventory option, etc.). To enter into the random selection for the giveaway, the guest selects an enter giveaway option 312, which is presented in the GUI 310 for as long as the giveaway is active and no winner has yet been selected.

Figure 3A:
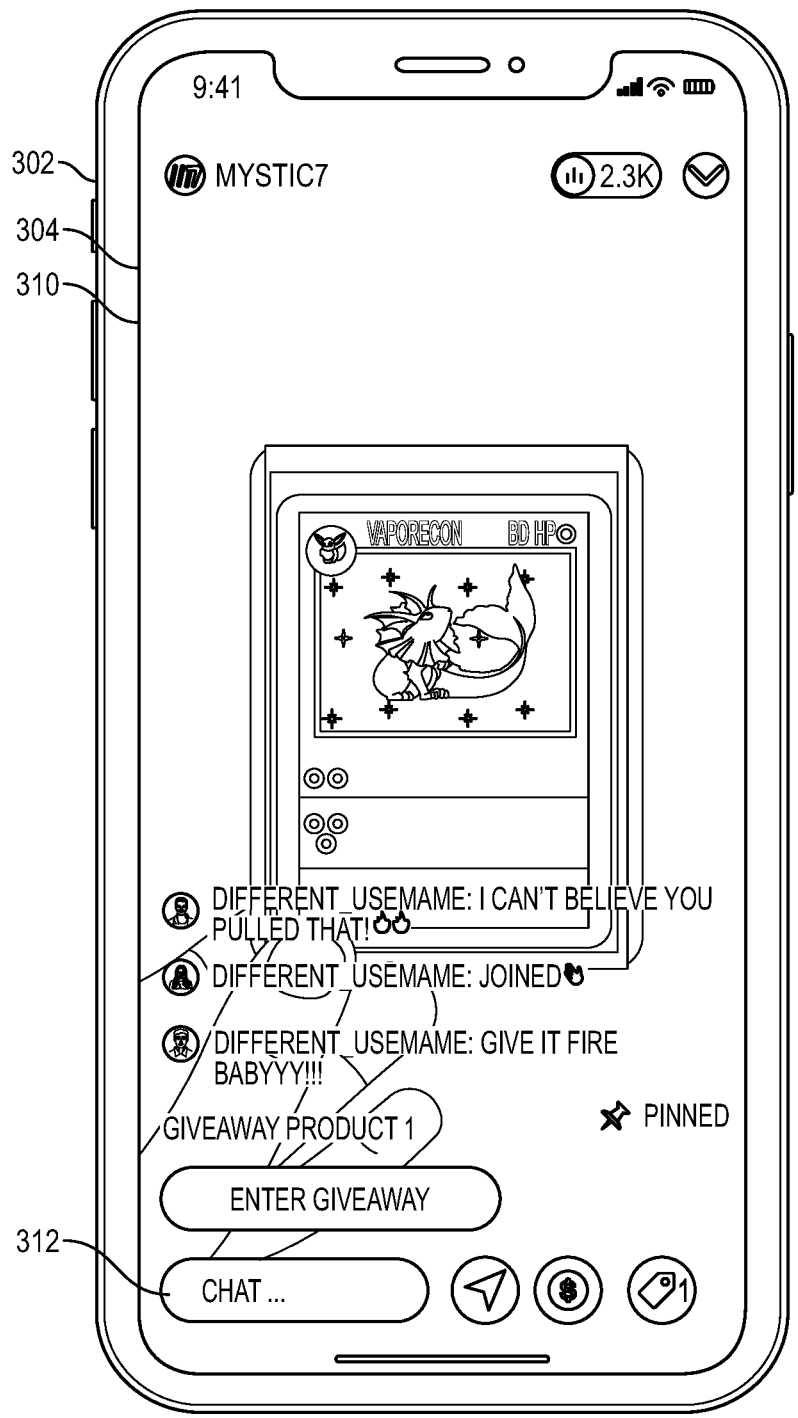
FIG. 3A is an example representation of a guest live event channel GUI executing on a mobile computing device, in accordance with some embodiments.
Figure 3B:
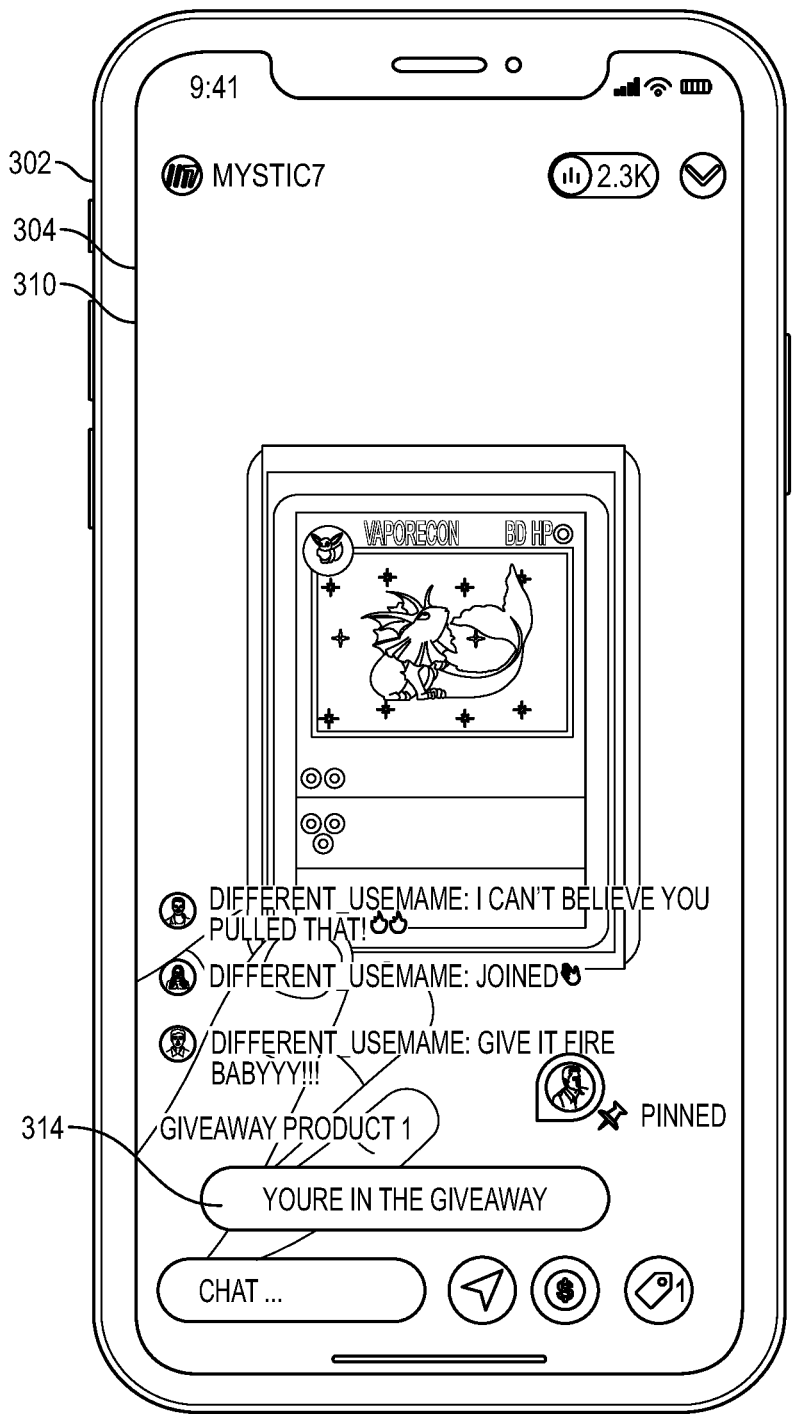
FIG. 3B is another example representation of the guest live event channel GUI of FIG. 3A, in accordance with some embodiments.

FIG. 3B depicts another view of the GUI 310 from FIG. 3A, with an indicator 314 indicating to the guest that the guest has entered into the giveaway. From this stage, the guest remains entered in the giveaway as long as the guest remains in the live event channel (i.e., as long as the guest has not exited the live event channel to view a different channel and/or other features of the live event application). If the guest leaves but re-enters the channel before selection of the winner, the guest is automatically re-entered in the giveaway without the guest needing to manually re-enter via the option 312 from FIG. 3A.

Figure 3C:
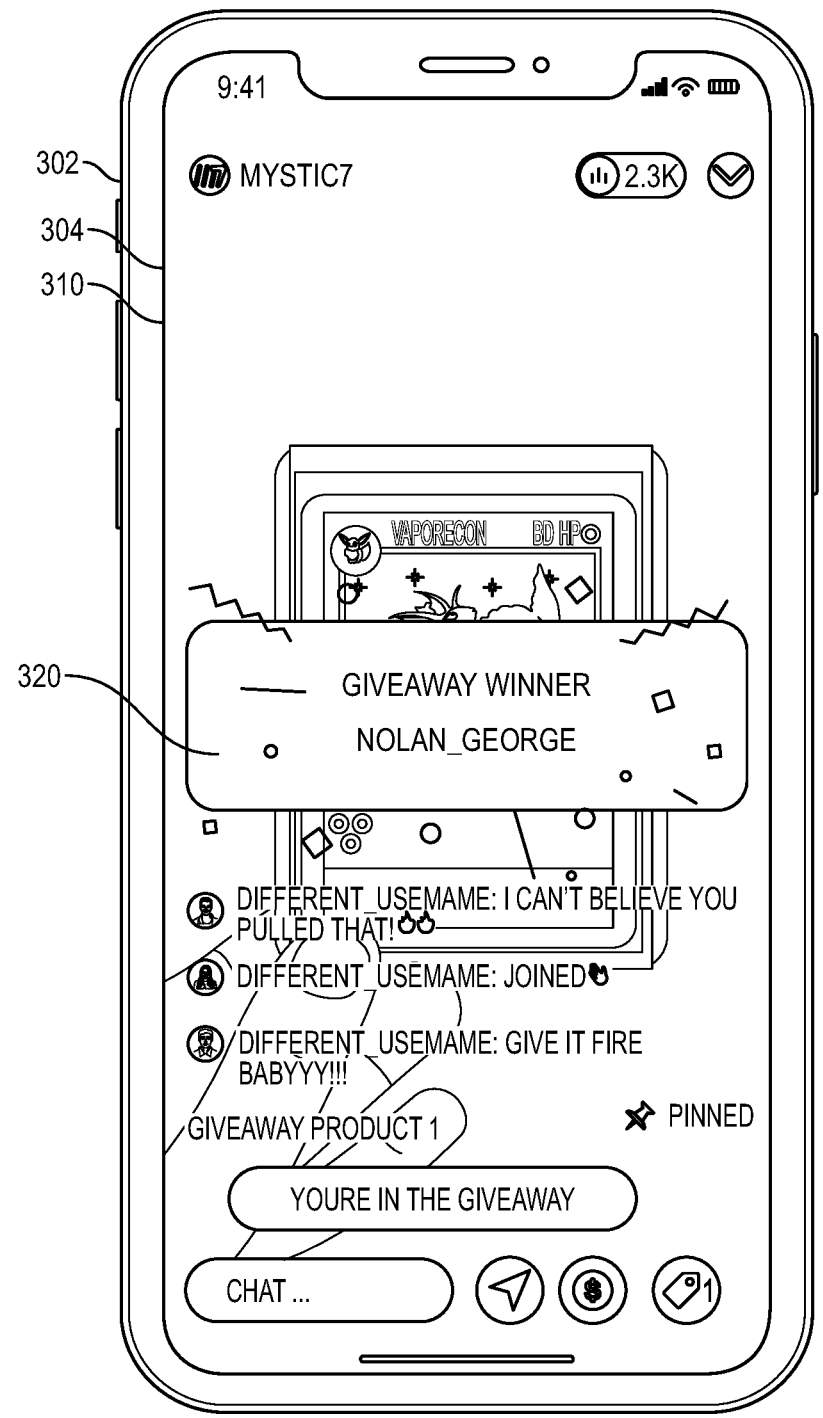
FIG. 3C is another example representation of a giveaway winner GUI executing on a mobile computing device, in accordance with some embodiments.
Figure 3D:
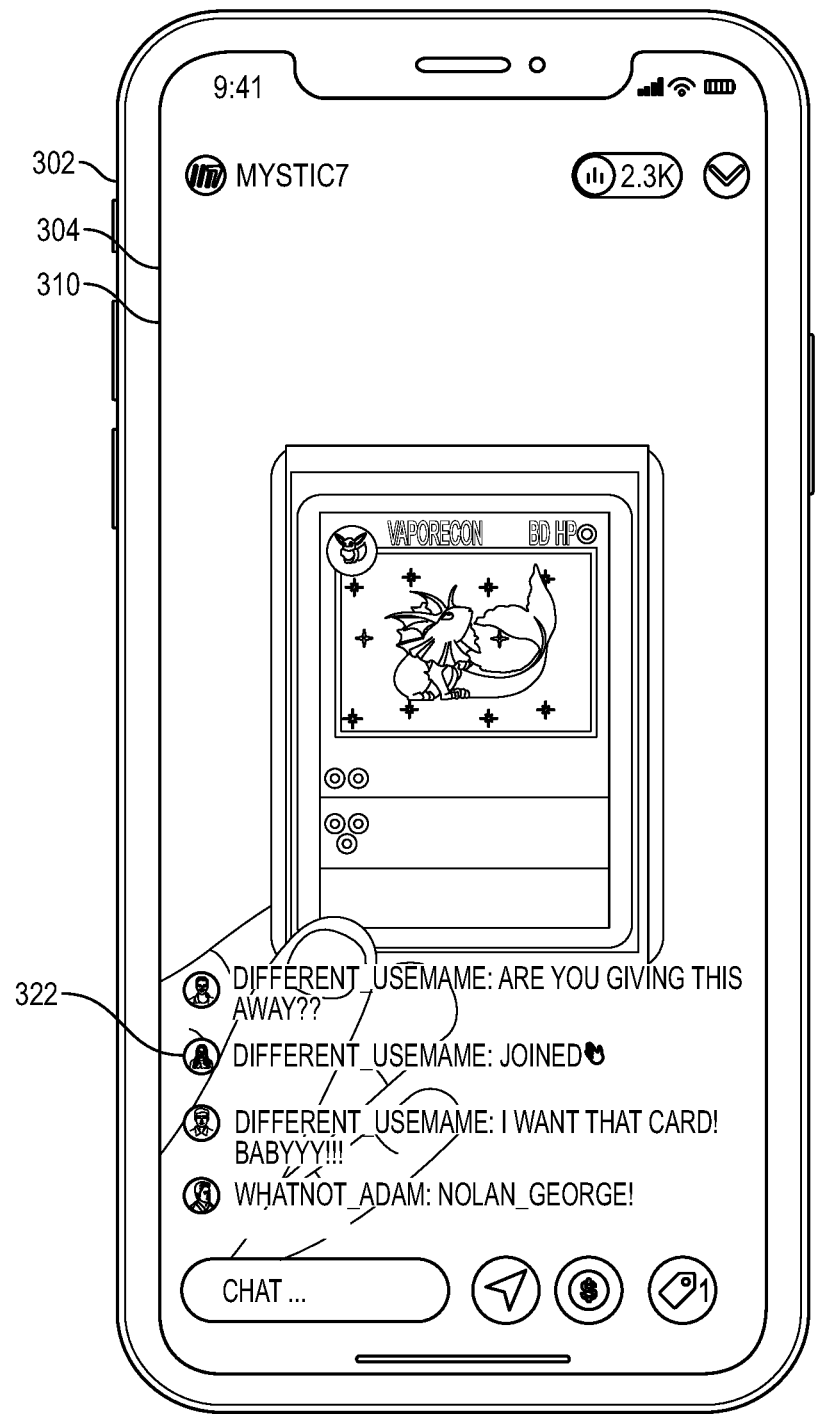
FIG. 3D is yet another example representation of the guest live event channel GUI, in accordance with some embodiments.
Figure 3E:
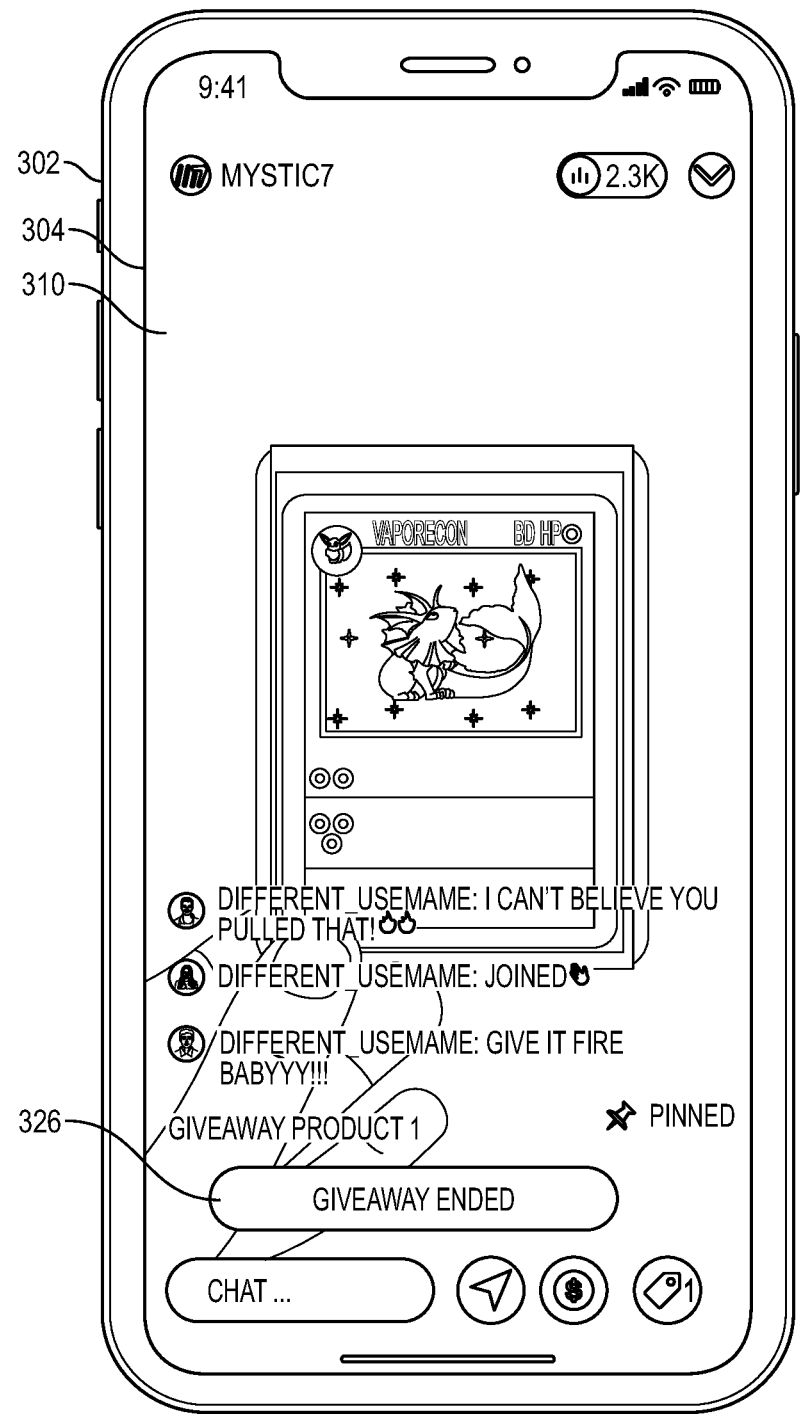
FIG. 3E is still yet another example representation of the guest live event channel, in accordance with some embodiments.

FIG. 3C depicts a giveaway winner GUI 320 similar to the GUI 260 of FIG. 2E. The GUI 320 displays the winner of the giveaway (e.g., via an animation) to the guest device. In FIG. 3D, the live event channel GUI 310 is updated to display the giveaway winner to the guest device 302 via a real-time chat log 322. After an amount of time has elapsed since display of the GUIs 3C and/or 3D, the GUI 310 as depicted in FIG. 3E is updated to include an indication 326 that the giveaway offering has ended. The indication 326 may continue to display until an offering of a next item (e.g., for auction, direct purchase, or giveaway) has begun.

Figure 3F:
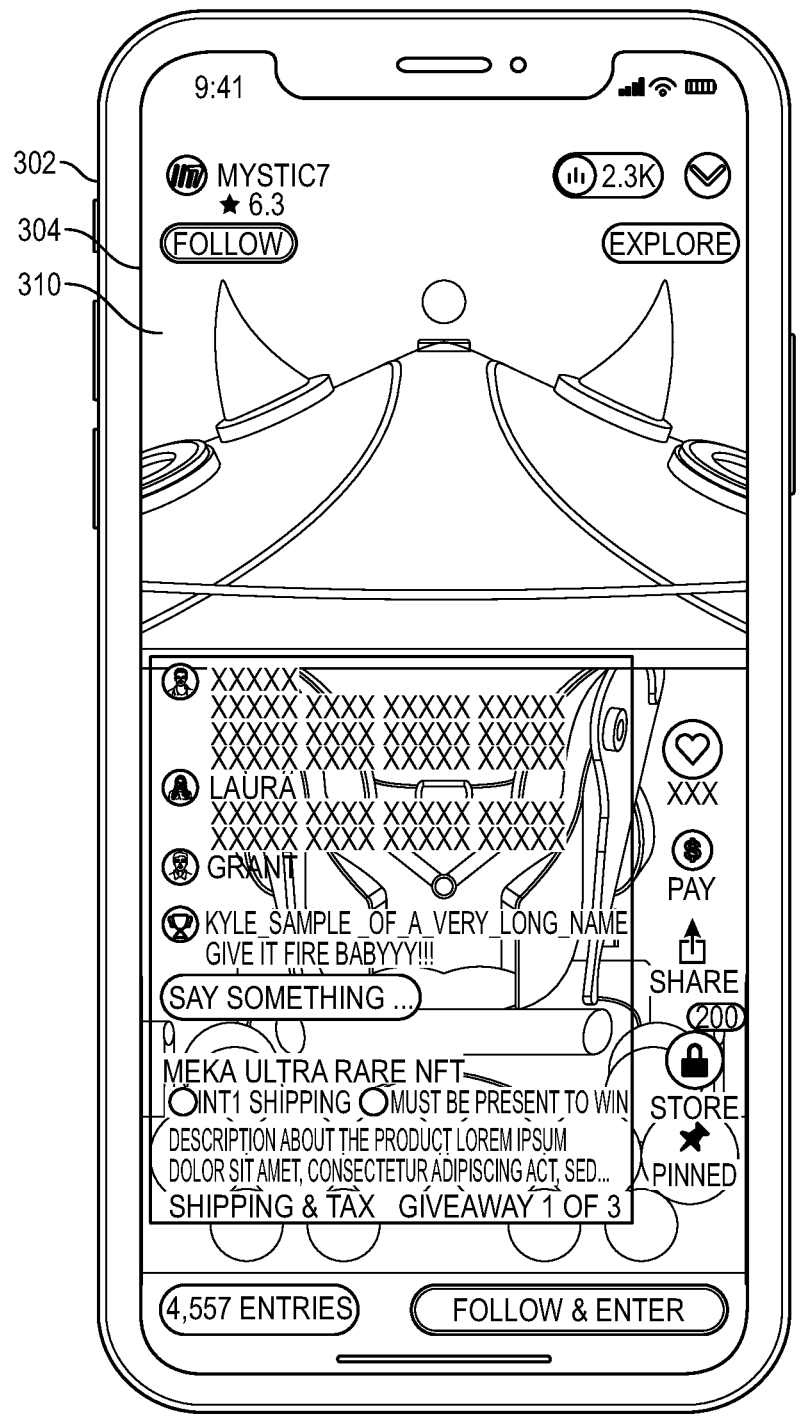
FIG. 3F is an example representation of an example giveaway entry GUI, in accordance with some embodiments.

FIG. 3F depicts an updated view of the live event channel GUI 310 at the guest device 302 in response to the start of a new offering of a different item. As in the depiction from FIGS. 3A and 2D, the GUI 310 indicates various relevant item/offering information (e.g., item name, description, entries count, etc.) and provides an option 330 that, when selected, causes the guest to both follow the host and enter the giveaway of the currently-indicated item.

Sequencing Items to be Offered in Live Event Channel

As noted in foregoing sections of this disclosure, previous implementations of functionalities for starting the offering of a next item after conclusion of the offering of a previous item could prove cumbersome to hosts, particularly those with large item inventories. FIGS. 4A-4F and 5A-5C depict example GUIs at a host device 402 (more particularly, a display 404, e.g., a touchscreen) which exemplify the challenges of previous implementations, and propose improved functionalities for sequencing first and second successive items in a live event channel. Via these improved functionalities, a "Run Next" option is automatically displayed to the host after conclusion of the offering of the first item to enable a smoother transition into the offering of the second item, and in some instances, to enable smoother transitions through an entire item queue of the host of the live event. The GUIs of FIGS. 4A-4F and 5A-5C may be displayed at the host device 402 based upon execution of non-transitory computer-executable instructions included in a live event application (as described herein) stored at the host device 402.

Figure 4A:
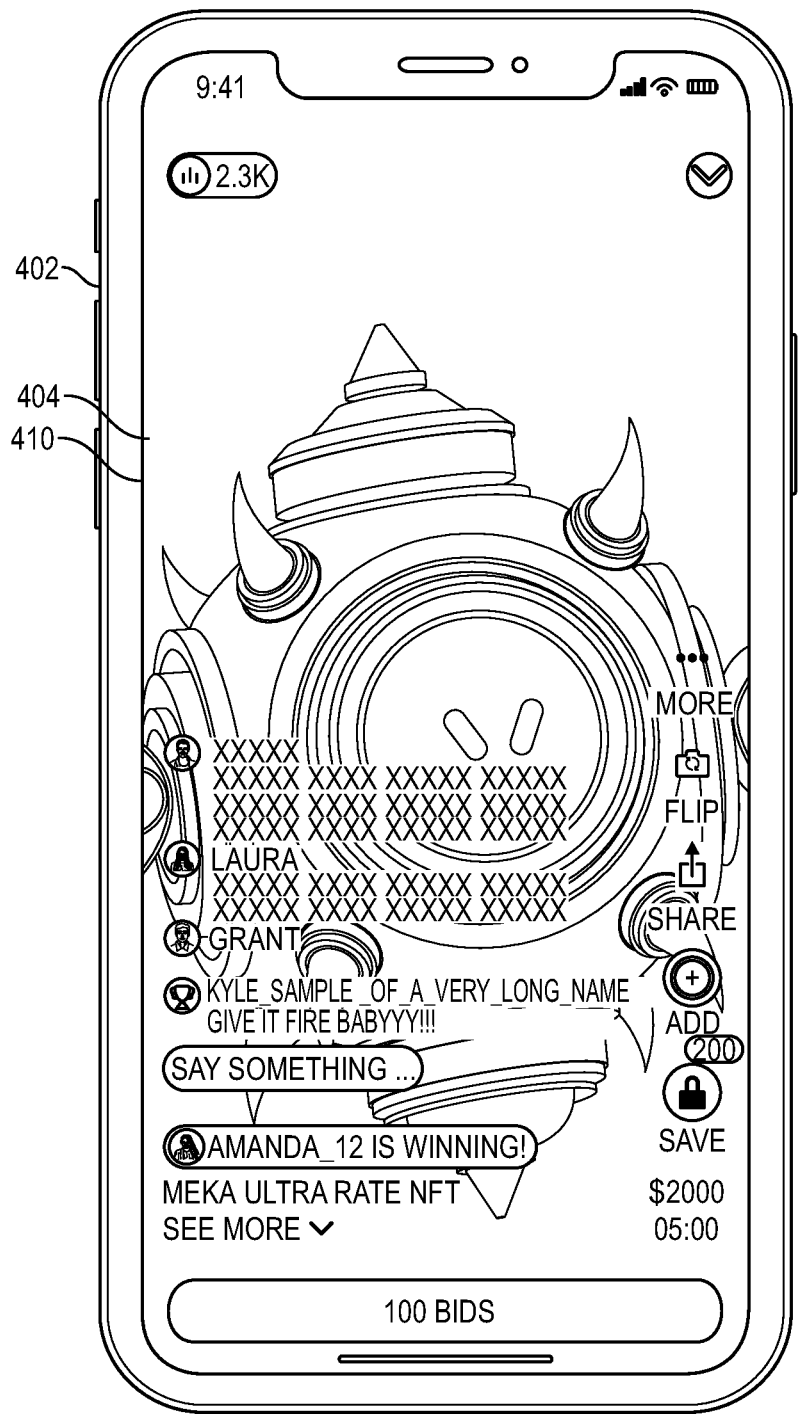
FIG. 4A is another example representation of a host live event channel GUI executing on a mobile computing device, in accordance with some embodiments.
Figure 4B:
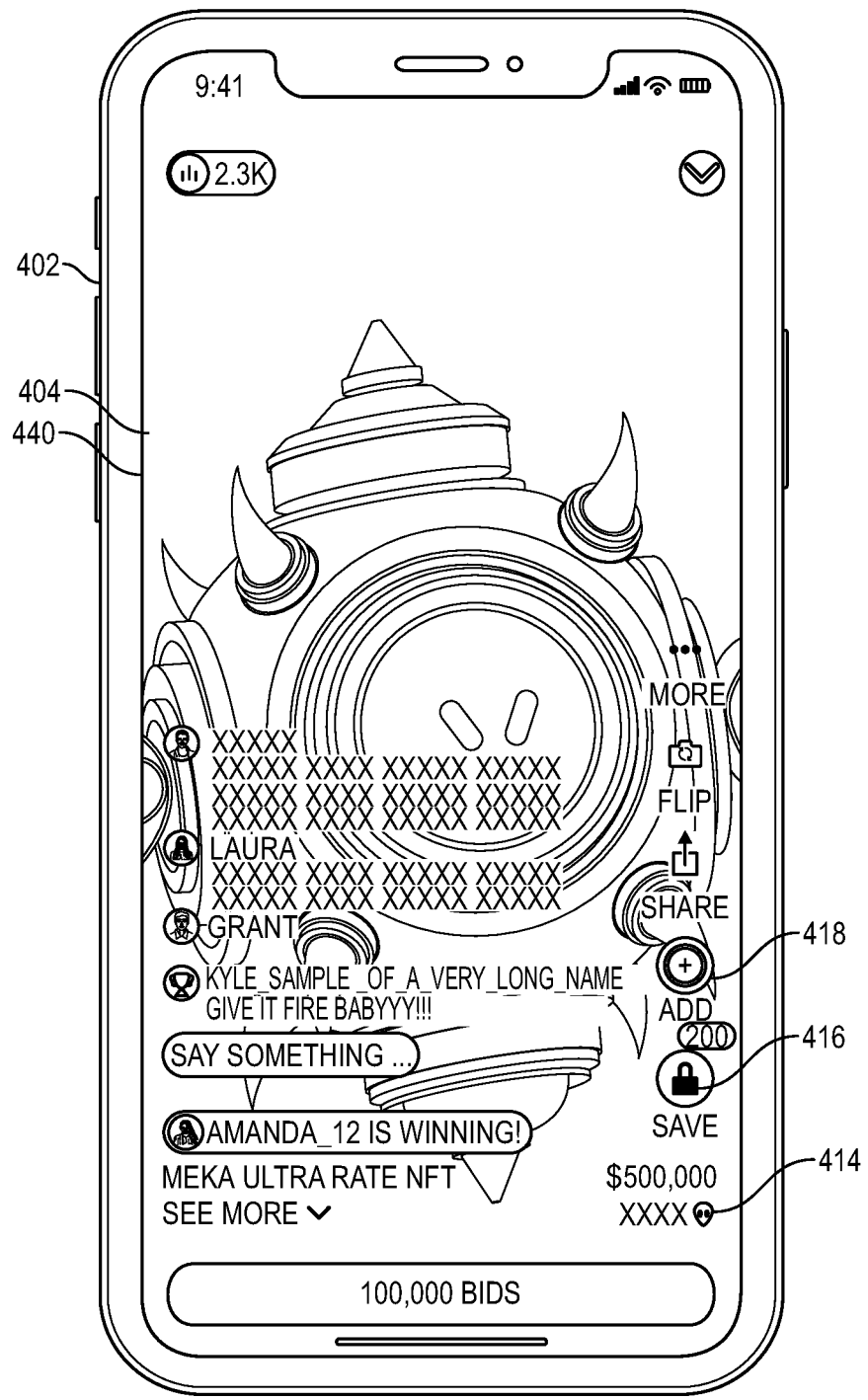
FIG. 4B is another example representation of the guest live event channel GUI of FIG. 4A, in accordance with some embodiments.

First referring to FIG. 4A, another live event channel GUI 410 depicts the state of the live event from the host's perspective during an offering of a first item (more particularly, an auction of the first item). The GUI 410 operates in a similar manner to that described with respect to the GUIs 310 and 240 of previous figures. For example, the GUI 410 displays, in conjunction with the host's own real-time video, real-time information associated with the offered item and channel including item information (e.g., name, description, etc.), viewer count, number of bids, current bid value, and time remaining in the auction. FIG. 4B depicts another view of the GUI 410 once most of the time in the auction has elapsed, as reflected in an updated timer 414.

Figure 4C:
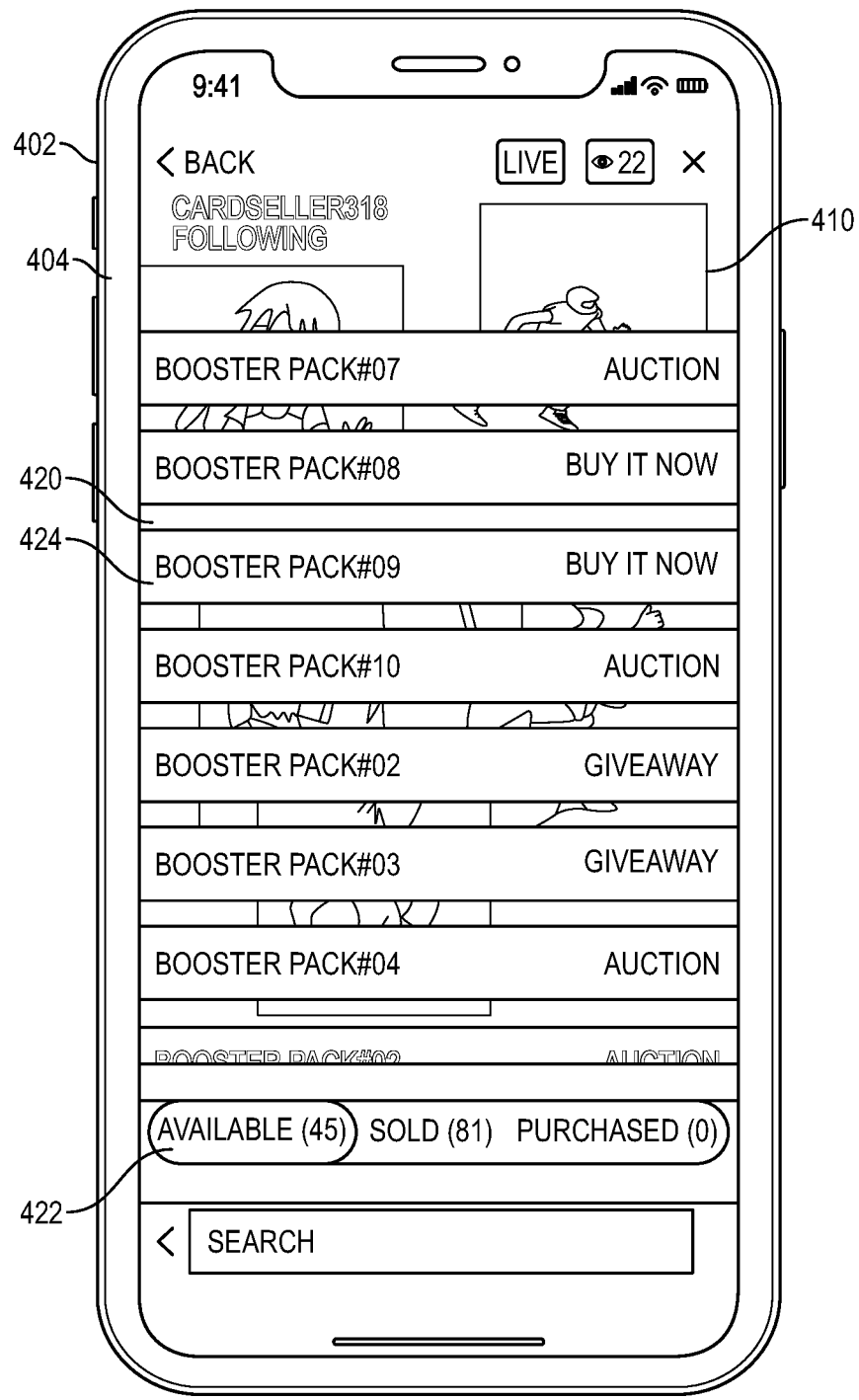
FIG. 4C is an example representation of a host item inventory GUI executing on a mobile computing device, in accordance with some embodiments.

In previous implementations, at the conclusion of the offering of the first item (e.g., once the auction timer reaches zero), starting the offering of the next item would usually involve opening an item inventory of existing items of the host (e.g., via a "store" option 416), or alternatively, adding an entirely new item altogether (e.g., via an "add" option 418, which may for example summon the GUI 210 of FIGS. 2A and 2B. FIG. 4C depicts an example item inventory GUI 420, which is displayed over the GUI 410. In the GUI 420, the host can use a ribbon 422 to navigate between items available in the host's inventory and items already sold (or given away) by the host. Each respective item entry 424 in the inventory indicates a name of the item and the type of offering that has been configured for the respective item. It can be observed that, in the GUI 420, navigating the available items for selection may involve scrolling through dozens of items. For particularly prolific sellers of items, though, navigating the GUI may involve scrolling through hundreds of items or more.

Figure 4D:
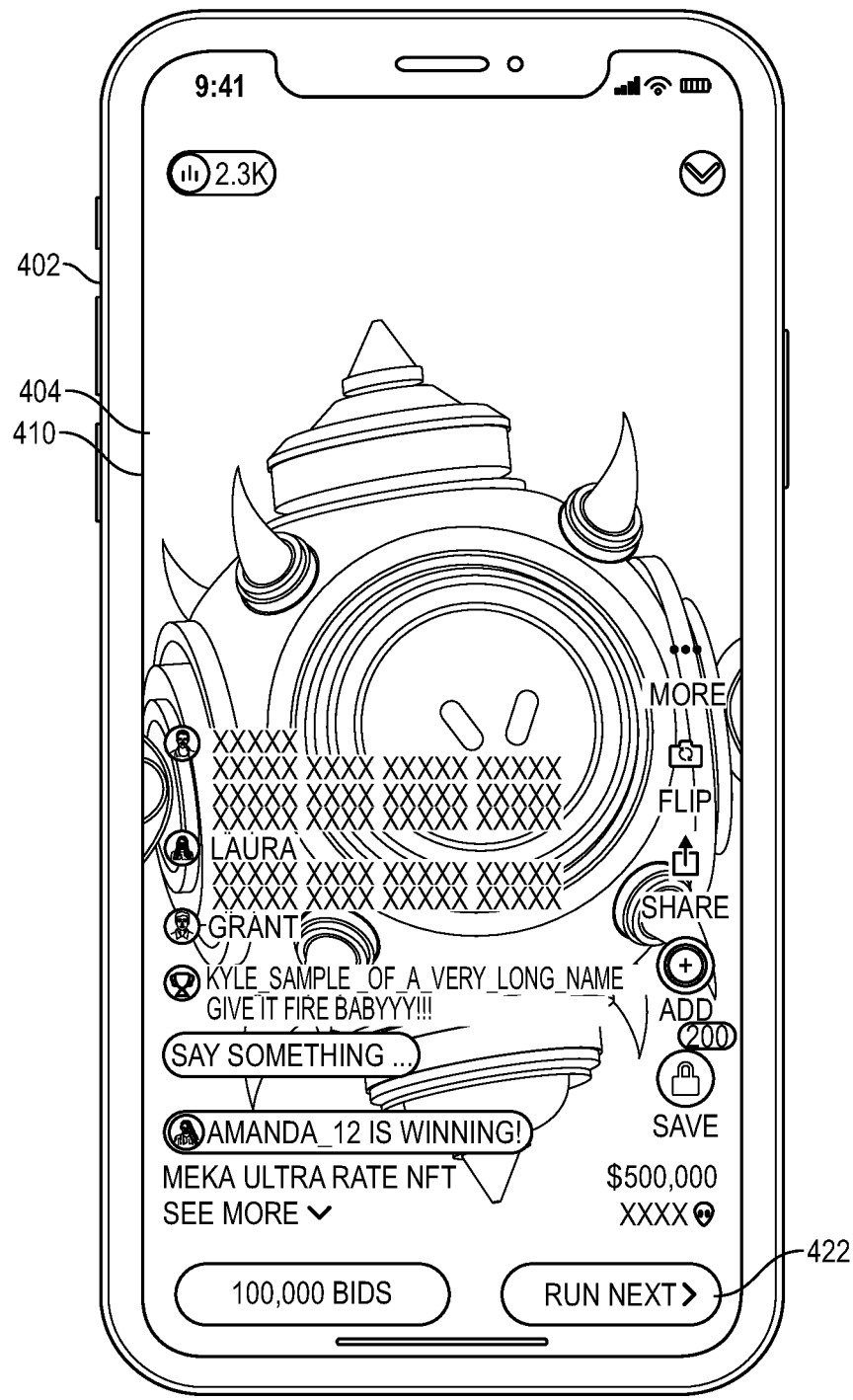
FIG. 4D is an example representation of a run next item GUI executing on a mobile computing device, in accordance with some embodiments.

An alternative approach to sequencing the offerings of first and second items is exemplified by the GUI 410 as depicted in FIG. 4D. Upon the conclusion of the offering of the first item (e.g., the end of the auction, or alternatively, when a giveaway winner is selected, or when a guest makes a direct purchase of the first item), the GUI 410 automatically updates to display a run next option 422, which the host can select to immediately and automatically start an offering of the second item (e.g., an auction, a direct purchase offering, or a giveaway). In embodiments, the second item for which the offering is triggered may be the item next in an order in which the host pre-configured an item queue prior to the live event (e.g., the order in which the host added the items, or in some other order explicitly configured by the host). In embodiments of this technique, the item inventory GUI 420 of FIG. 4C can be updated to automatically display the items as ordered in the host's item queue. Moreover, in some embodiments, this updated item inventory GUI 420 supports drag-and-drop operations and/or other input to enable the host to re-order certain items in the queue (e.g., to bring a particular item to the front or near the front of the queue, or to push particular items further back in the queue).

Figure 4E:
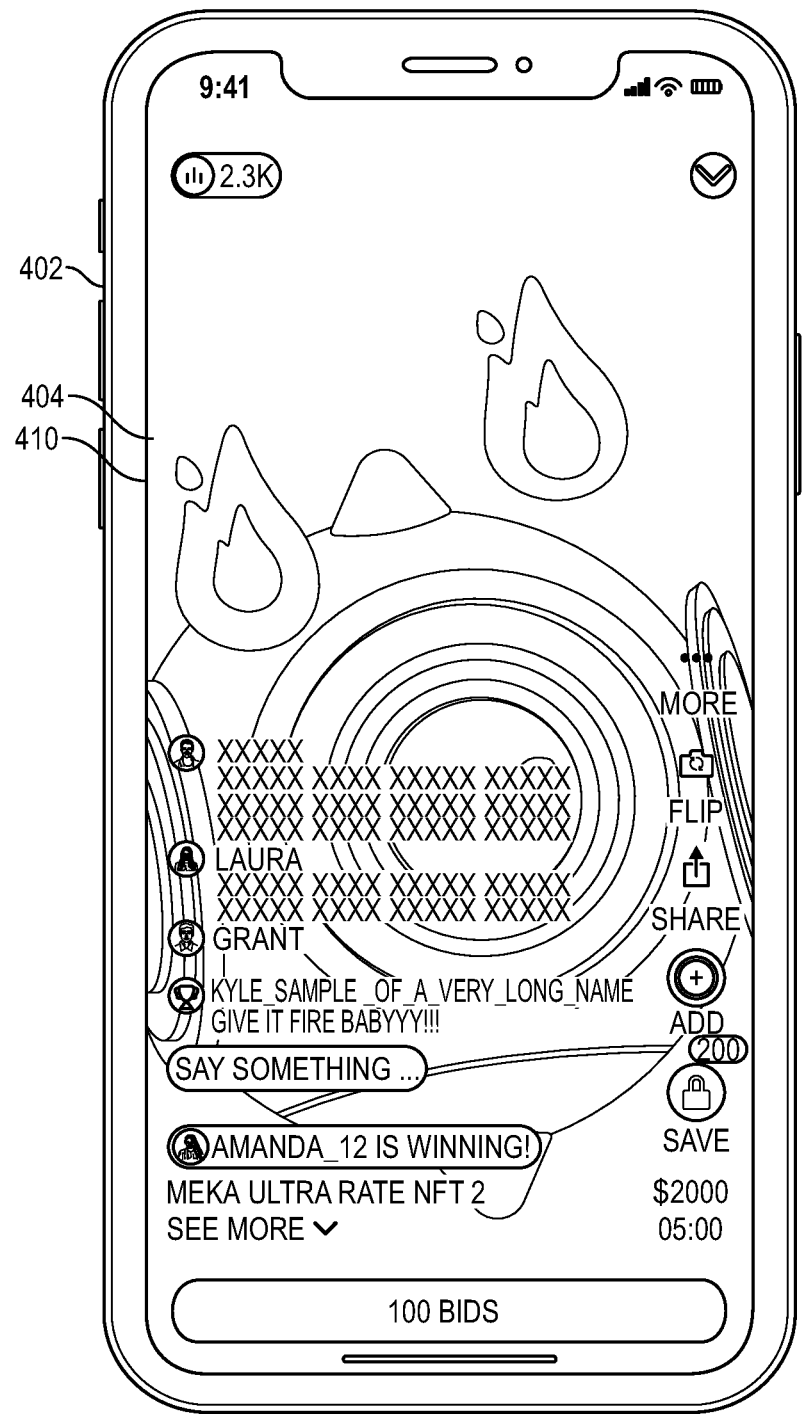
FIG. 4E is an example representation of a next item offering GUI executing on a mobile computing device, in accordance with some embodiments.

In embodiments, upon selection of the run next option 422 of FIG. 4D, the live event automatically starts the offering of the second item according to preconfigured and/or default settings associated with the second item. For example, as depicted in FIG. 4E, the live event channel GUI 410 may update to start an auction of the second item when the host previously configured the second item to be offered for auction. If the host has not pre-defined certain parameters associated with the second item offering (e.g., auction starting price, timer, buy it now price, etc.), default or previously-used settings may be automatically applied to the offering of the second item. In any case, as with the offering of the first item, the GUI 410 displays the host's real-time video stream in conjunction with real-time information about the offered item and/or the live event channel (e.g., item name, description, price, viewer count, comments, etc.).

Figure 4F:
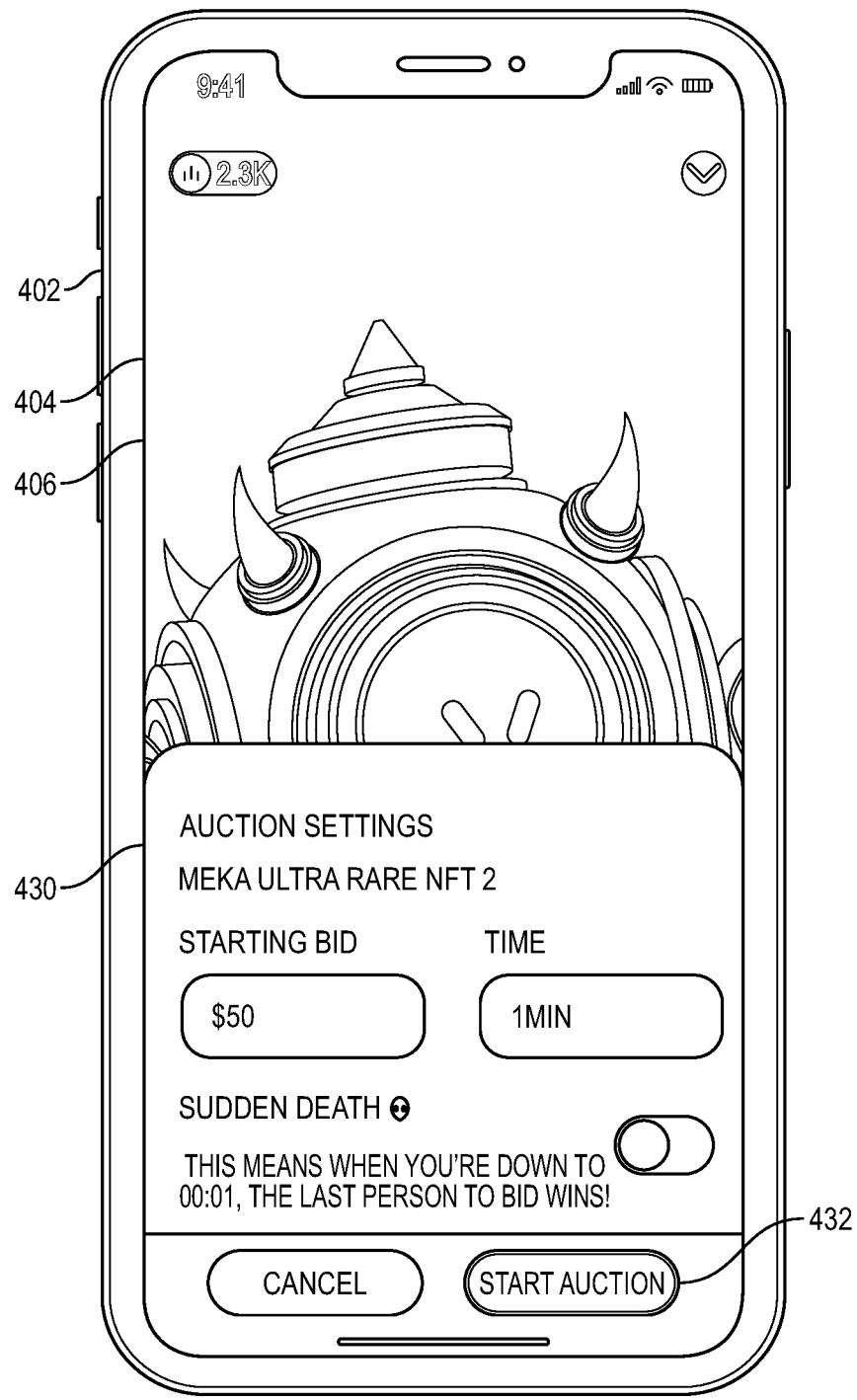
FIG. 4F is an example representation of a next offering settings GUI executing on a mobile computing device, in accordance with some embodiments.

In some embodiments, instead of proceeding directly to the offering of the second item, selection of the run next option 422 summons a settings GUI 430 that may be displayed over the live event channel GUI 410, as depicted in FIG. 4F. The settings GUI 430 displays item information associated with the next item to be offered, as well as fields to define parameters associated with the selected offering type (e.g., auction starting amount, timer, required bid increment, etc.). For fields not pre-configured by the host, the fields in the GUI 430 may be pre-populated with default and/or previously used settings. In any case, selecting a start option starts the offering of the second item (e.g., the auction) according to the configured settings in the GUI 430, thus allowing for further customization of the offering of the second item with still simple functionality from the host's perspective.

Although the examples of FIGS. 4A-4F depict auction offerings of the first and second items, it should be understood that similar techniques can be applied, with appropriate modifications, to other offering types including direct purchase and giveaways. Moreover, offerings of two different types may be sequenced directly adjacent to each other without deviation from the techniques described herein (e.g., an auction may directly follow a direct purchase, or a giveaway may directly follow an auction, etc.).

Figure 5A:
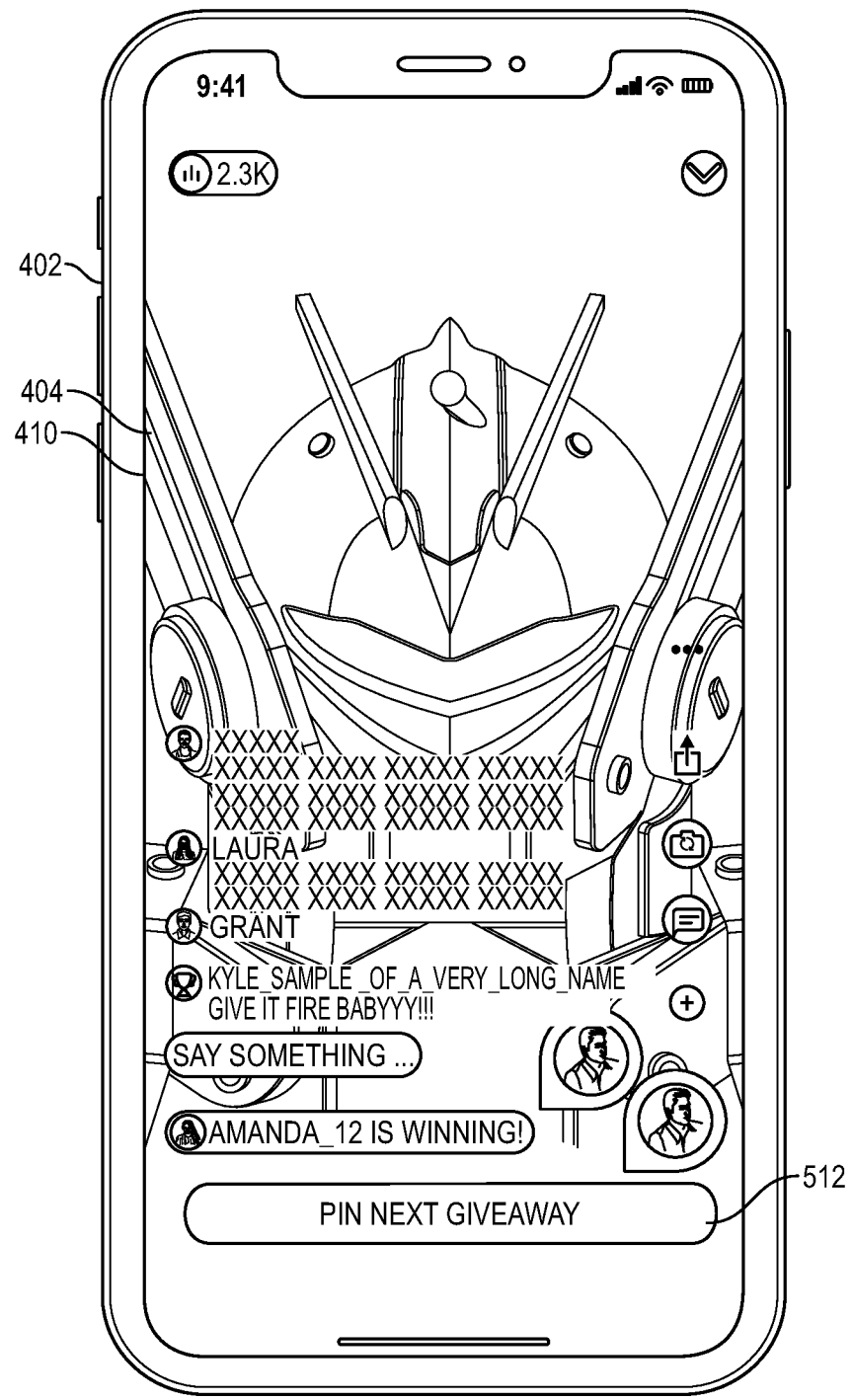
FIG. 5A is an example representation of a pin GUI executing on a mobile computing device, in accordance with some embodiments.

Still another aspect of the Run Next and item queuing features described herein enables the host to "pin" an item to be the next offering in the live event channel, regardless of the previous configuration of the item queue (in other words, pushing the pinned item to the top or front of the item queue). The host may, for example, use the item inventory GUI 420 of FIG. 4C to select a particular item that the host wants to pin (or alternatively, select the item via other means). In response to selecting the item, the host's live event channel GUI 410 may display a pin option 512 as shown in FIG. 5A to pin the selected item as the next offering (based upon the offering mode configured for the item, e.g., giveaway). Selecting the option 512 causes the subsequent use of the Run Next option to automatically start the offering of the pinned item. Alternatively, in some options, using the pin option enables the host to skip the Run Next step completely, with the live event channel automatically starting the offering of the pinned item after a predetermined time has elapsed since the conclusion of the previous item offering. Effectively, this pin functionality enables the host to navigate items to be offered next at any time during the offering of the previous item (e.g., while an auction is active, before selection of a giveaway winner, or before a direct purchase occurs), rather than just once the offering of the previous item has concluded.

Figure 5B:
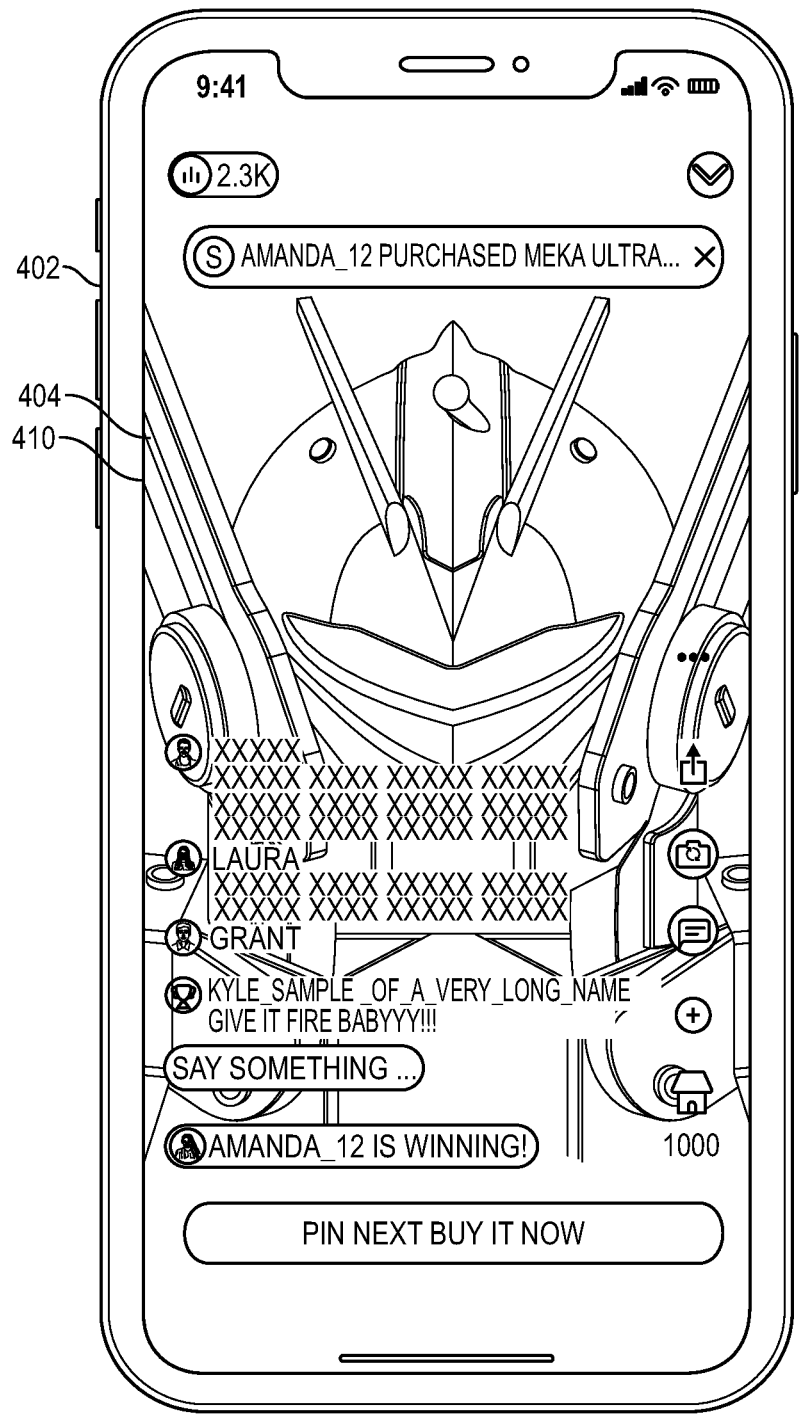
FIG. 5B is another example representation of a pin GUI executing on a mobile computing device, in accordance with some embodiments.
Figure 5C:
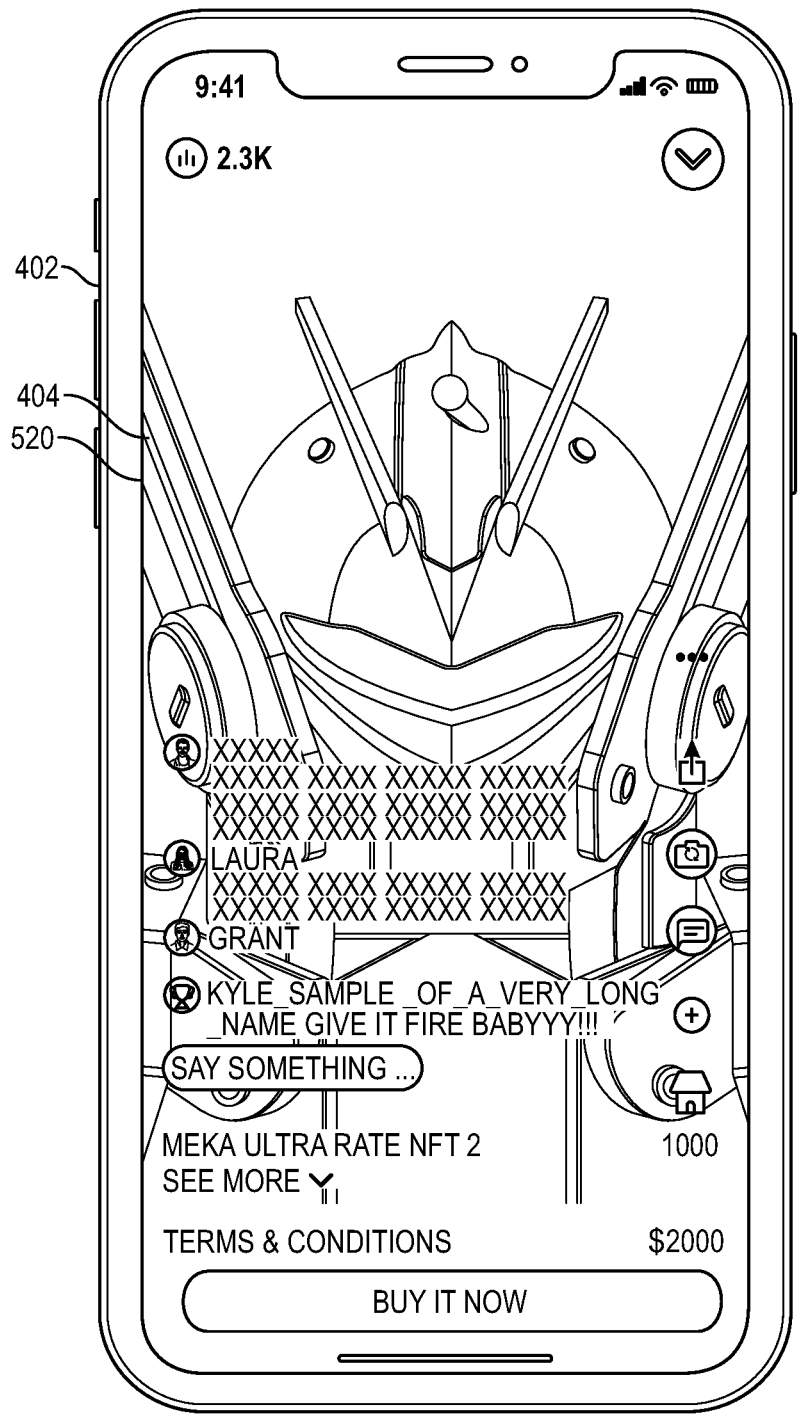
FIG. 5C is another example representation of a direct purchase offering GUI executing on a mobile computing device, in accordance with some embodiments.

In view of the above description of FIG. 5A, FIG. 5B depicts another representation of the host's live event channel GUI 410, which similarly allows the host to pin a next direct purchase offering to take place after the conclusion of the offering of a current item. FIG. 5C depicts another updated view of the GUI 410 with the next direct purchase offering active. Once again, it should be appreciated that the item queuing and pinning techniques described above may be implemented, with appropriate modifications in view of the present disclosure, to other modes of offering the item (e.g., auction). Moreover, use of the pin feature can chain different types of offerings together (e.g., an auction can be pinned during a direct purchase offering, or a giveaway can be pinned during an auction offering).

Example Mobile Computing Device and Server

Figure 6:
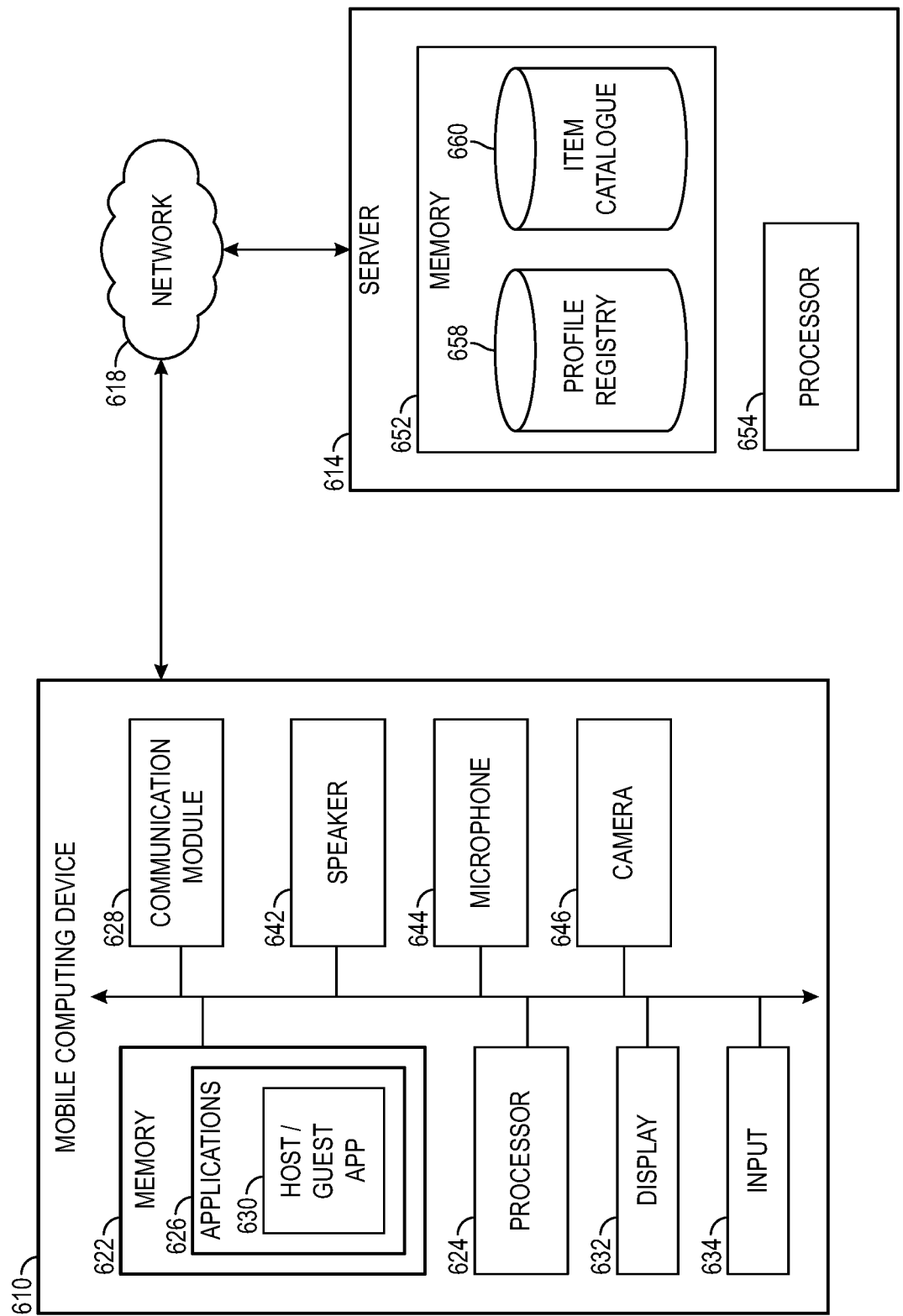
FIG. 6 is a block diagram of an example mobile computing device and server, in accordance with some embodiments.

FIG. 6 depicts a block diagram of example components of a mobile computing device 610 and a server 614 communicating over a network 618, in accordance with embodiments of the systems and methods described herein. The mobile computing device 610 may correspond, for example, to any of the mobile computing devices of the present description (e.g., the host device 110a, 202, or 402, the guest device 110b, 302, etc.). The server 614 may correspond, for example, to the event server 124, and/or to another one or more servers of the present description. The mobile computing device and/or server 614 may include additional, fewer, or alternate components to those described in this section, in various embodiments. Additionally, in some embodiments, the mobile computing device 610 may be substituted for another computing device(s), e.g., a desktop computer or laptop computer.

The mobile computing device 610 may include a memory 622, which may include one or more non-transitory memories (e.g., ROM) and/or one or more volatile memories (e.g., RAM). In particular, non-transitory portions of the memory 622 may store non-transitory, computer executable instructions that are executable by a processor 624 (i.e., one or more processors) to cause the mobile computing device 610 to perform actions described in this detailed description. Non-transitory portions of the memory 622 may include one or more applications 626. Each respective application 626 may include one or more sets of non-transitory computer executable instructions that, when executed by the processor 624, cause the mobile computing device 610 to perform operations associated with the respective application 626 (e.g., operations involving the processor 624, a communication module 628, and/or other components of the mobile computing device 610 discussed herein). The one or more applications may include a live event application 630 ("Host/Guest App") usable to access live events as described herein.

The mobile computing device 610 may include a display unit 632 (i.e., one or more display devices, such as a touch-enabled visual display ("touchscreen") or other visual display). The mobile computing device may further include an input unit 634 (i.e., one or more user input devices, e.g., a touchscreen or touchpad, a keyboard, a mouse, etc.). In some embodiments, aspects of the display unit 632 and 634 are integrated (e.g., as a touchscreen with both touch input and display capability). The display unit 632 and/or the input unit 634 may be physically included within the mobile computing device 610 (e.g., a fixedly installed touchscreen), or may be operatively coupled with the mobile computing device 610 by other means (e.g., a peripheral touch pad, mouse, keyboard, etc. connected to the mobile computing device 610 by wired and/or wireless means).

The mobile computing device 610 may include a speaker 642, a microphone 644, and/or a camera 646. In some embodiments, the mobile computing device 610 may include still other sensor components, e.g., a positioning unit (e.g., GPS), an accelerometer, a gyroscope, etc. The speaker 642, microphone 644, camera 646, and/or other sensor component(s) may be physically included within the mobile computing device 610 (e.g., a natively installed speaker, microphone, or camera), and/or may be operatively coupled with the mobile computing device 610 by other means (e.g., a peripheral camera, speaker, or microphone connected to the mobile computing device 610 by wired and/or wireless means).

Collectively, the display unit 632, input unit 634, speaker 642, microphone 644, camera 646, and/or other sensing component(s) may provide one or more user interfaces of the mobile computing device 610. For example, the display unit 632 may display/present one or more graphical user interfaces (GUIs) which may include interactive controls that the user of the mobile computing device 610 can activate via the input device 634 to cause functionalities described herein to be performed (e.g., via a touchscreen tap or swipe, a mouse click, a keyboard stroke, etc.). Additionally or alternatively, in some embodiments, similar user interfaces may be provided at least partially by the speaker 642, microphone 644, camera 646, and/or other sensing components of the mobile computing device 610 (e.g., an interactive audio interface, a gesture-based user interface, or a user interface responsive to physical movement of the mobile computing device 610). In some embodiments, a user of the live event application 630 at the mobile computing device 610 may configure device permissions defining components of the mobile computing device 610 the live event application 630 may use to provide GUIs, provide notifications, and/or perform other functionalities.

The server 614 (i.e., one or more servers, e.g., the event server 124 and/or other servers of FIG. 1) include a memory 652, which may include one or more non-transitory memories (e.g., ROM) and/or one or more volatile memories (e.g., RAM). In particular, non-transitory portions of the memory 652 may store non-transitory, computer executable instructions that are executable by a processor 654 (i.e., one or more processors) to cause the mobile computing device to perform actions described in this detailed description. Non-transitory portions of the memory 652 may include, for example, one or more applications containing non-transitory instructions for controlling logic and communications relating to live events, user profiles, device configuration information, analytics, etc. The memory 652 may further include one or more APIs configured to control communications between the server 614 and the mobile computing device 610. Still additionally or alternatively, the memory 652 may store a profile registry 658, which may store various information described herein as relating to user profiles. Still yet additionally or alternatively, the memory 652 may store an item catalogue 660, e.g., defining known items for easier inclusion in live events (e.g., as described with respect to the item catalogue server 132 of FIG. 1).

The network 618 may include any suitable one or more communications networks, e.g., the Internet, a wired or wireless local area network (LAN), etc. Communications over the network 618 may include communications according to any suitable one or more communications protocols, including for example a mobile cellular communications protocol (e.g., CDMA, GSM, EV-DO, LTE, IP, etc.), one or more IEEE 802.11 protocols (e.g., Wi-Fi), Bluetooth, and/or other suitable protocols in accordance with the computing capabilities of the mobile computing device 610 and/or the server 614.

Various additional or alternative computing elements may be envisioned, in various embodiments. In particular, it should be understood that the server 614 may communicate over the network 618 with many mobile computing devices 614, e.g., belonging to various combinations of hosts and/or guests.

Example Computer-Implemented Methods

Figure 7:
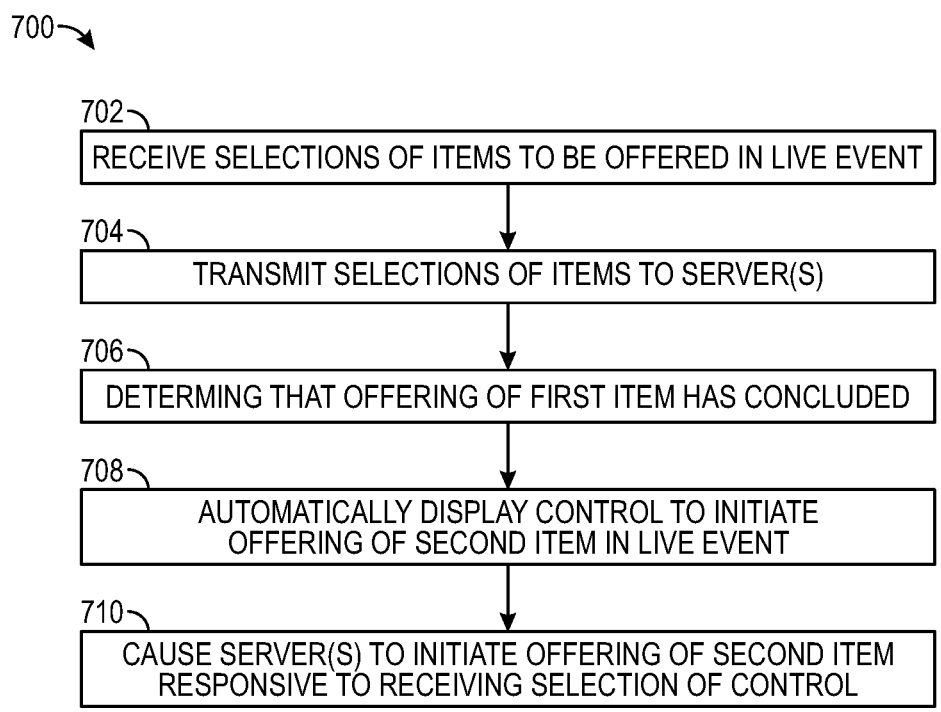
FIG. 7 is a flow diagram of an example method implemented via a client computing device, in accordance with some embodiments.

FIG. 7 depicts a block diagram of an example computer-implemented 700 associated with sequencing offerings of two or more items in a live event (e.g., one or more auctions, one or more offers for direct purchase, and/or one or more giveaways). The method 700 may be performed, for example, by a client computing device of a host user in accordance with techniques of the present description. The client computing device may, for example, be a host device 110*a*, 202, 402, and/or 610 as described in foregoing sections of the present description.

In embodiments, one or more memories of the client computing device may store non-transitory, computer executable instructions that, when executed via one or more processors of the client computing device, cause the client computing device to perform actions of the method 700. Furthermore, in some embodiments, one or more non-transitory computer readable media may be provided (e.g., a non-removable computer memory, a removable flash drive, etc.), the one or more non-transitory computer readable media storing instructions that, when executed by the client computing device, cause the client computing device to perform actions of the method 700. Order of actions of the method 700 may vary from the order depicted in FIG. 7, and actions of the method 700 may be combined and/or substituted with other actions described in the present description, in various embodiments.

The method 700 includes receiving, from the client computing device of a host user of a live event, selections of a plurality of items to be offered in the live event (702, e.g., to a plurality of guest users in the live event, accessed via respective guest client computing devices of the guest users). In embodiments, at least a portion of the selections of the plurality of items can be received prior to the live event (e.g., by the host pre-configuring a listing or queue of items to be offered in the live event). Additionally or alternatively, in some embodiments, at least a portion of the selections of the plurality of items can be received during the live event (e.g., the host user navigates an item inventory and adds items to be offered during the event. In any case, selecting the items may include defining various parameters associated with the respective offerings of the items (e.g., initial auction price, auction minimum bid increment, auction duration, direct purchase price, direct purchase duration, etc.). The method 700 further includes transmitting, to one or more servers (e.g., event server 124 of FIG. 1), first communications indicative of the selections of the plurality of items (704).

The method 700 still further includes determining that a first offering of a first item of the plurality of items in the live event has concluded (706). Determining at the client computing device that the offering of the first item has concluded may be based upon receiving communications from the one or more servers, e.g., indicating that a guest user has performed a direct purchase, or indicating that the timer for an auction has ended. In some embodiments, though, determining that the offering of the first item has concluded includes other actions at the client computing device, e.g., receiving an interaction to select a giveaway winner.

In any case, the method 700 still yet further includes, responsive to determining that the first offering of the first item has concluded, automatically displaying, via a first graphical interface of the client computing device, a control selectable to automatically initiate a second offering of a second item of the plurality of items (708, e.g., "Run Next" control). In some embodiments, the method 700 includes, responsive to determining that the first offering of the first item has concluded, querying the one or more servers to identify which item among the plurality of items is the second item to be offered. The one or more servers may, for example, maintain an item queue associated with the live event, and may serve the client computing device of the host user with an identification of a next item (automatically, and/or in response to a query) each time an offering of a previous item has concluded. In any case, the displaying of the control at the client computing device of the host user may be based upon the identification of the second item through communications with the one or more servers.

The method 700 further includes, responsive to receiving a selection of the control, automatically transmitting, via to the one or more servers, second communications (710). The second communications may cause the one or more servers to initiate the offering of the second item via the live event, e.g. by distributing information associated with the second offering of the second item to each of the plurality of guest devices. The communications of action 710 may be performed, for example, via a publish/subscribe messaging channel associated with the live event, as described in the present description. For example, transmitting the second communications to the one or more servers may be performed via the client computing device publishing messages to the one or more servers acting as a message broker. The one or more servers may distribute information associated with the offering of the second item (e.g., item name, item description, current bids, prices, offering duration, etc.), by publishing the information to the plurality of guest devices that are subscribed to the live event at the start of the offering of the second item. Still additional and/or alternative actions of the method 700 may be implemented via publish/subscribe communications, in various embodiments.

The method 700 may include additional, fewer, and/or alternate actions, in various embodiments. In some embodiments, the method 700 includes obtaining a video stream associated with the live event, via a camera unit associated with the client computing device (e.g., an internal camera or a peripheral camera). In these embodiments, the method 700 may include transmitting the video stream to the one or more servers (e.g., such that the one or more servers can distribute the video stream in real-time to guest devices to create a video-enabled live event. Moreover, the client computing device of the host user may display the first graphical user interface (comprising the "Run Next" control) by displaying the control (and/or other item/offering information) over a representation of the video stream at a display of the client computing device.

Additionally or alternatively, in some embodiments, the method 700 may include receiving, receiving, during the first offering of the first item, via a second graphical user interface of the client computing device of the host user, one or more interactions to pin an item from the selected plurality of items. In these embodiments, the method 700 may include, responsive to receiving the one or more interactions, transmitting third communications to the one or more servers cause the pinned item to be the second item from among the plurality of items, such that the second offering is an offering of the pinned item.

Additional Considerations

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are depicted and described as separate operations, one or more of the individual operations may be performed concurrently, and nothing requires that the operations be performed in the order depicted. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout the present disclosure, embodiments are described in which various elements are optional—present in some, but not all, embodiments of the system. Where such elements are depicted in the accompanying figures and, specifically, in figures depicting block diagrams, the optional elements are generally depicted in dotted lines to denote their optional nature.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for generating dynamic user experience applications through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims. The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for sequencing respective offerings of a plurality of items to be offered in a live event, the method comprising:
    receiving, via one or more processors of a client computing device of a host user of the live event, selections of the plurality of items to be offered to a plurality of guest users of respective guest devices in the live event, the host user being a different user than each of the guest users, and the host device being a different device than each of the respective guest devices;
    transmitting, via the one or more processors to one or more servers, first communications indicative of the selections of the plurality of items;
    determining, via the one or more processors, that a first offering of a first item of the plurality of items in the live event has concluded;
    responsive to determining that the first offering of the first item has concluded, automatically displaying, via a first graphical user interface of the client computing device of the host user, a control selectable to automatically initiate a second offering of a second item of the plurality of items; and
    responsive to receiving a selection of the control, automatically transmitting, via the one or more processors to the one or more servers, second communications to cause the one or more servers to initiate the offering of the second item via the live event by distributing information associated with the second offering of the second item to each of the plurality of guest devices.

2. The computer-implemented method of claim 1, further comprising, responsive to determining that the first offering of the first item has concluded:
    via the one or more processors of the client computing device of the host user, querying the one or more servers to identify the second item of the plurality of items; and
    displaying the control at the client computing device of the host user based upon the identification of the second item.

3. The computer-implemented method of claim 2, wherein the identifying of the second item via the one or more servers is based upon an item queue for the live event, the item queue stored by the one or more servers.

4. The computer-implemented method of claim 1, wherein transmitting the second communications to the one or more servers comprises transmitting the second communications via a publish/subscribe messaging channel associated with the live event.

5. The computer-implemented method of claim 1, further comprising:
    obtaining, via a camera unit associated with the client computing device of the host user, a video stream associated with the live event; and
    via the one or more processors, transmitting the video stream to the one or more servers in real-time,
    wherein the client computing device displays the first graphical user interface by displaying the control over a representation of the video stream.

6. The computer-implemented method of claim 1, further comprising:
    receiving, during the first offering of the first item, via a second graphical user interface of the client computing device of the host user, one or more interactions to pin an item from the selected plurality of items; and
    responsive to receiving the one or more interactions, transmitting, via the one or more processors to the one or more servers, third communications to cause the pinned item to be the second item from among the plurality of items, such that the second offering is an offering of the pinned item.

7. The computer-implemented method of claim 1, wherein the second offering of the second item is a giveaway of the second item to a randomly-selected guest user from among the plurality of guest users.

8. One or more non-transitory computer readable media storing instructions that, when executed via one or more processors of a client computing device of a host user of a live event, cause the client computing device to:
   receive selections of a plurality of items to be offered to a plurality of guest users of respective guest devices in the live event, the host user being a different user than each of the quest users, and the host device being a different device than each of the respective guest devices;
   transmit, to one or more servers, first communications indicative of the selections of the plurality of items;
   determine that a first offering of a first item of the plurality of items in the live event has concluded;
   responsive to determining that the first offering of the first item has concluded, automatically display, via a first graphical user interface, a control selectable to automatically initiate a second offering of a second item of the plurality of items; and
   responsive to receiving a selection of the control, automatically transmit, to the one or more servers, second communications to cause the one or more servers to initiate the offering of the second item via the live event by distributing information associated with the second offering of the second item to each of the plurality of guest devices.

9. The one or more non-transitory computer readable media of claim 8, wherein the instructions, when executed via the one or more processors, further cause the client computing device to, responsive to determining that the first offering of the first item has concluded:
   query the one or more servers to identify the second item of the plurality of items; and
   display the control at the client computing device of the host user based upon the identification of the second item.

10. The one or more non-transitory computer readable media of claim 9, wherein the identifying of the second item via the one or more servers is based upon an item queue for the live event, the item queue stored by the one or more servers.

11. The one or more non-transitory computer readable media of claim 8, wherein the instructions to transmit the second communications to the one or more servers comprise instructions to transmit the second communications via a publish/subscribe messaging channel associated with the live event.

12. The one or more non-transitory computer readable media of claim 8, wherein the instructions, when executed via the one or more processors, further cause the client computing device to:
   obtain, via a camera unit associated with the client computing device, a video stream associated with the live event;
   transmit the video stream to the one or more servers in real-time; and
   display the first graphical user interface by displaying the control over a representation of the video stream.

13. The one or more non-transitory computer readable media of claim 8, wherein the instructions, when executed via the one or more processors, further cause the client computing device to:
   receive, during the first offering of the first item, via a second graphical user interface, one or more interactions to pin an item from the selected plurality of items; and
   responsive to receiving the one or more interactions, transmit, to the one or more servers, third communications to cause the pinned item to be the second item from among the plurality of items, such that the second offering is an offering of the pinned item.

14. The one or more non-transitory computer readable media of claim 8, wherein the second offering of the second item is a giveaway of the second item to a randomly-selected guest user from among the plurality of guest users.

15. A client computing device of a host user of a live event, the client computing device comprising:
   one or more processors; and
   one or more computer memories storing non-transitory instructions that, when executed via the one or more processors, cause the client computing device to:
      receive selections of a plurality of items to be offered to a plurality of guest users of respective guest devices in the live event, the host user being a different user than each of the quest users, and the host device being a different device than each of the respective guest devices;
      transmit, to one or more servers, first communications indicative of the selections of the plurality of items;
      determine that a first offering of a first item of the plurality of items in the live event has concluded;
      responsive to determining that the first offering of the first item has concluded, automatically display, via a first graphical user interface, a control selectable to automatically initiate a second offering of a second item of the plurality of items; and
      responsive to receiving a selection of the control, automatically transmit, to the one or more servers, second communications to cause the one or more servers to initiate the offering of the second item via the live event by distributing information associated with the second offering of the second item to each of the plurality of guest devices.

16. The client computing device of claim 15, wherein the instructions, when executed via the one or more processors, further cause the client computing device to, responsive to determining that the first offering of the first item has concluded:
   query the one or more servers to identify the second item of the plurality of items, wherein the identifying of the second item via the one or more servers is based upon an item queue for the live event, the item queue stored by the one or more servers; and
   display the control at the client computing device of the host user based upon the identification of the second item.

17. The client computing device of claim 15, wherein the instructions to transmit the second communications to the one or more servers comprise instructions to transmit the second communications via a publish/subscribe messaging channel associated with the live event.

18. The client computing device of claim 15, wherein the instructions, when executed via the one or more processors, further cause the client computing device to:
   obtain, via a camera unit associated with the client computing device, a video stream associated with the live event;
   transmit the video stream to the one or more servers in real-time; and display the first graphical user interface by displaying the control over a representation of the video streams.

19. The client computing device of claim 15, wherein the instructions, when executed via the one or more processors, further cause the client computing device to:
   receive, during the first offering of the first item, via a second graphical user interface, one or more interactions to pin an item from the selected plurality of items; and
   responsive to receiving the one or more interactions, transmit, to the one or more servers, third communications to cause the pinned item to be the second item from among the plurality of items, such that the second offering is an offering of the pinned item.

20. The client computing device of claim 15, wherein the second offering of the second item is a giveaway of the second item to a randomly-selected guest user from among the plurality of guest users.

* * * * *